(12) United States Patent
Inoue et al.

(10) Patent No.: US 9,062,786 B2
(45) Date of Patent: Jun. 23, 2015

(54) COMPRESSOR RELIEF VALVE CAP AND COVER

(75) Inventors: Yoshinori Inoue, Aichi-ken (JP); Kenta Nishimura, Aichi-ken (JP); Koji Ishii, Aichi-ken (JP); Atsuo Sumi, Aichi-ken (JP); Atsushi Shibata, Aichi-ken (JP); Toru Mizutani, Aichi-ken (JP); Terunao Kono, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 443 days.

(21) Appl. No.: 13/432,560

(22) Filed: Mar. 28, 2012

(65) Prior Publication Data

US 2012/0247586 A1 Oct. 4, 2012

(30) Foreign Application Priority Data

Mar. 31, 2011 (JP) ................................. 2011-079421
Aug. 22, 2011 (JP) ................................. 2011-180301

(51) Int. Cl.
*F16K 24/00* (2006.01)
*F04B 39/10* (2006.01)
*F04B 39/12* (2006.01)
(Continued)

(52) U.S. Cl.
CPC ................ *F16K 24/00* (2013.01); *F04B 39/10* (2013.01); *F04B 39/121* (2013.01); *F04B 53/10* (2013.01); *F04C 28/28* (2013.01); *F04C 29/126* (2013.01); *F16K 27/12* (2013.01)

(58) Field of Classification Search
CPC . F16K 37/00; F16K 37/0008; F16K 37/0066; G01L 19/08; B60C 23/02; F15B 19/005; F16F 9/0209

USPC ................ 251/118, 127, 120; 417/307, 312; 137/528–543.23, 557; 181/237, 254, 181/255; 116/272
See application file for complete search history.

(56) References Cited

U.S. PATENT DOCUMENTS 640,406 A * 1/1900 Noyes ............................ 417/307
1,032,482 A * 7/1912 Jerauld ......................... 137/472
(Continued)

FOREIGN PATENT DOCUMENTS

CN             101981318 A     2/2011
DE     20 2005 014 946 U1     2/2006
(Continued)

OTHER PUBLICATIONS

Korean Office Action issued May 27, 2013 in Patent Application No. 10-2012-0033158.
(Continued)

*Primary Examiner* — Matthew W Jellett
(74) *Attorney, Agent, or Firm* — Sughrue Mion, PLLC

(57) ABSTRACT

A relief valve for a compressor includes a valve body, a relief port, a cap and a cover. The relief port is formed in the end of the valve body and refrigerant gas is blown out through the relief port if pressure in the compressor is excessively increased. An engaging portion is formed in the cover so as to be engageable with the valve body such that the cover is prevented from moving relative to the valve body. With the cover is mounted on the valve body through the cap, the relief port is covered by the end of the cap, a first clearance is formed between the ends of the cap and the valve body so as to be in communication with the relief port, and a flowing passage for refrigerant gas blown out through the relief valve is formed from the relief port through the first clearance.

12 Claims, 17 Drawing Sheets

(51) Int. Cl.
    *F04B 53/10*     (2006.01)
    *F04C 28/28*     (2006.01)
    *F04C 29/12*     (2006.01)
    *F16K 27/12*     (2006.01)

(56) References Cited

U.S. PATENT DOCUMENTS

| | | | | |
|---|---|---|---|---|
| 1,482,517 | A | * | 2/1924 | Kelsey ............ 137/224 |
| 2,113,691 | A | * | 4/1938 | Heller ............ 417/419 |
| 5,794,915 | A | | 8/1998 | Shimizu et al. |
| 5,913,664 | A | * | 6/1999 | Shimizu et al. ............ 417/307 |
| 8,042,564 | B2 | * | 10/2011 | Ando et al. ............ 137/202 |
| 8,430,647 | B2 | | 4/2013 | Akaya et al. |
| 2003/0234049 | A1 | | 12/2003 | Vicars |
| 2011/0174396 | A1 | | 7/2011 | Akaya et al. |

FOREIGN PATENT DOCUMENTS

| | | |
|---|---|---|
| EP | 0 784 173 A2 | 7/1997 |
| JP | 7-004357 A | 1/1995 |
| JP | 07-004357 A | 1/1995 |
| JP | 9-166081 A | 6/1997 |
| JP | 3038681 B2 | 5/2000 |
| JP | 3266985 B2 | 3/2002 |
| JP | 2010-053750 A | 3/2010 |
| KR | 10-0454778 | 4/2005 |

OTHER PUBLICATIONS

Extended European Search Report for corresponding EP Patent Application No. 12161504.1 dated Apr. 2, 2013.

\* cited by examiner

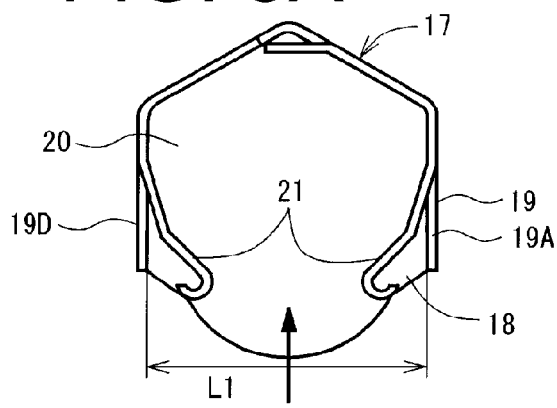
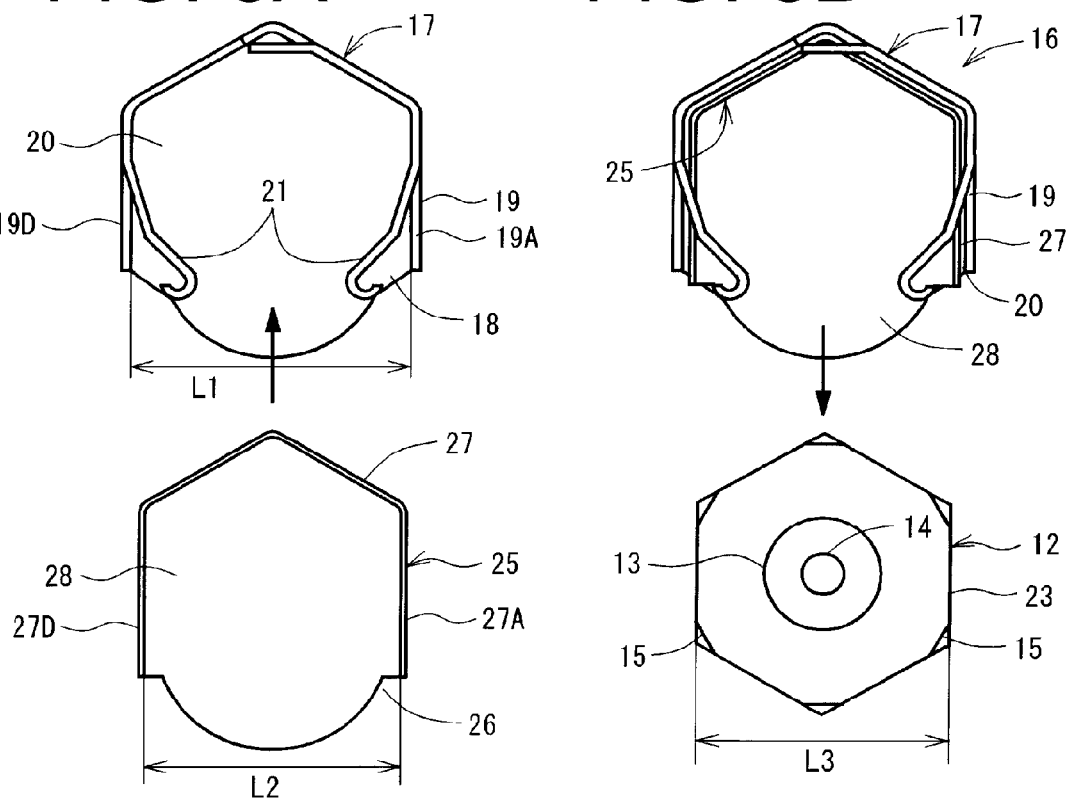
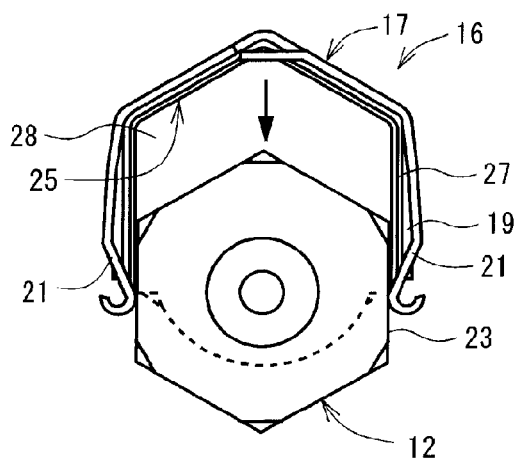
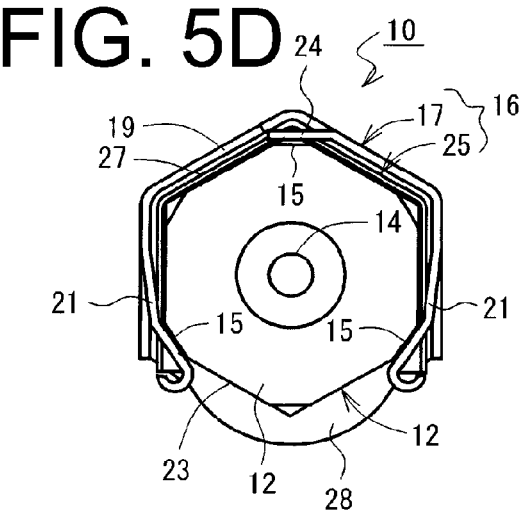

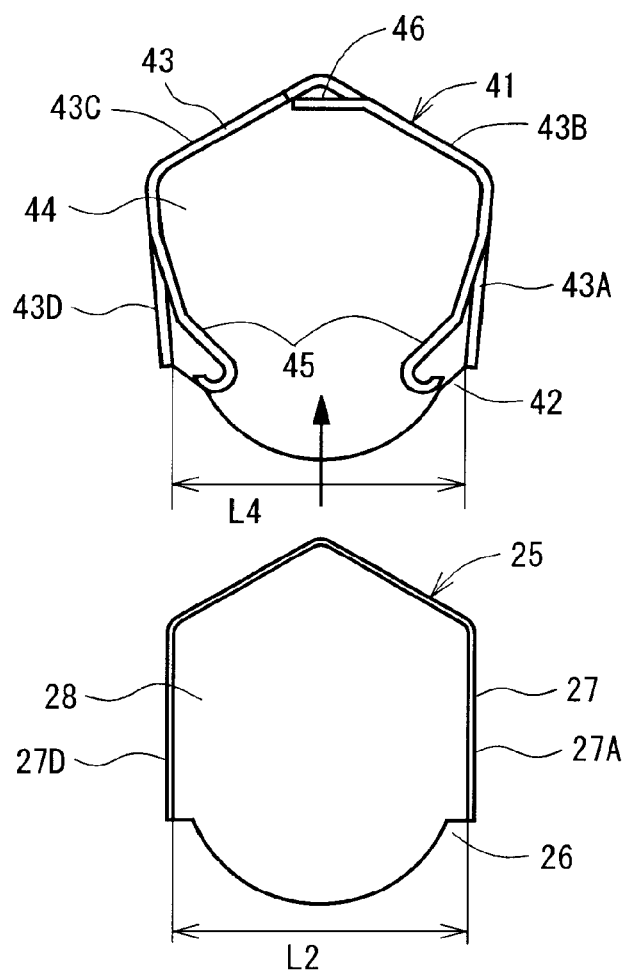
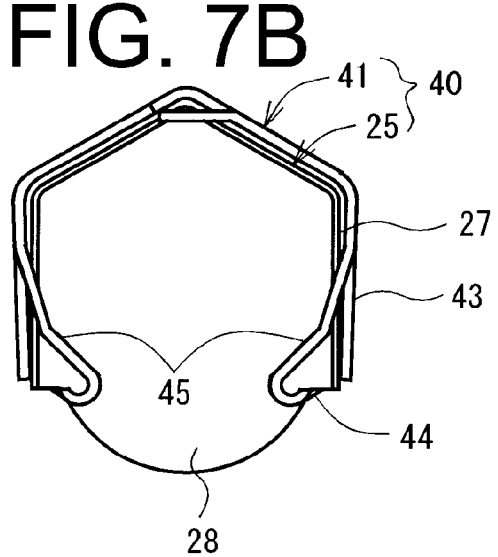

COMPRESSOR RELIEF VALVE CAP AND COVER

BACKGROUND OF THE INVENTION

The present invention relates to a relief valve for a compressor installed in an engine compartment of a vehicle.

A compressor for a vehicle air conditioner is mounted in an engine compartment of a vehicle and driven to rotate by driving force of a vehicle engine thereby to compress refrigerant gas and supplies the compressed refrigerant gas to a refrigerant circuit of the vehicle air conditioner. The rotational speed of the vehicle engine is varied in proportion to the variation of the running speed of the vehicle. The cooling load in the vehicle compartment is also varied, so that the compressor should preferably be of a variable displacement type. Due to a drastic change of operating condition of the compressor, the temperature and the pressure of the compressor are also changed greatly. For example, the pressure of the compressor may be increased excessively by severe weather conditions. Some compressors are equipped with a relief valve for releasing such excessively increased pressure. When the relief valve of the compressor is actuated, a part of refrigerant gas in the compressor is blown out of the compressor through the outlet of the relief valve. The high-pressured refrigerant gas blown out of the compressor impinges directly against peripheral devices disposed in the engine compartment of the vehicle, thereby causing damages to such peripheral devices.

Japanese Patent No. 3266985 discloses a cap for a relief valve for a compressor that is used to protect peripheral devices disposed adjacent to the compressor against high-pressured refrigerant gas being released from the compressor. The cap is made of a resin material. The cap is engaged with the outer peripheral surface of a hexagonal nut of the relief valve. The cap has a polygonal prism excluding two bottom sides of the base of the polygonal prism and a cap end formed integrally with the end of the polygonal prism for turning refrigerant gas blown out through the outlet of the relief valve to a direction that is perpendicular to the axis of the relief valve. The polygonal prism has at the end thereof opposite from the cap end a pair of elastically deformable holding arms formed integrally with the polygonal prism and a pair of slits formed adjacent to the holding arms. The cap is mounted on the valve body by moving the cap relative to the valve body along the radial direction of the relief valve such that the paired holding arms of the polygonal prism of the cap are elastically deformed and then engaged with a cylindrical case of the valve body. The polygonal prism is engaged with the outer peripheral surface of the hexagonal nut of the relief valve so as to cover the outlet of the relief valve by the cap end. In the relief valve, a clearance is formed between the outlet and the cap end and communicates with a guide port. According to the cap of the relief valve disclosed in the above-identified Japanese Patent No. 3266985, refrigerant gas blown out through the outlet of the relief valve is guided positively in one direction.

Japanese Patent No. 3038681 discloses another relief valve for a compressor. In this relief valve, the cover formed by bending a plate is detachably mounted on the valve body. The cover includes a hexagonal shield portion, three first legs and two second legs. The first legs are formed by bending part of the cover at right angle so as to extend from three alternate sides of hexagon of the shield portion of the cover. Each first leg of the cover has a pair of fixing hooks for engagement with a projection of the valve body. An elastic member having a shape of hexagonal block with a predetermined thickness is mounted on the cover so as to cover the relief port of the relief valve. The elastic member has formed therein a U-shaped groove where the elastic member is in contact with the relief valve. The cover and the elastic member are mounted on the valve body by moving the cover and the elastic member relative to the relief valve in the axial direction of the relief valve such that the elastic member is received in a space formed between the shield portion and the first and second legs and the cover and the elastic member are pressed together in the axial direction of the relief valve thereby to engage the first fixing hooks of the first legs of the cover with the projection of the valve body. The elastic member is mounted on the valve body so as to cover the outlet of the relief valve and to be interposed between the shield portion of the cover and the valve body in a compressed state. A passage for refrigerant gas is formed between the end surface of the valve body and the groove formed in the elastic member. According to the relief valve for a compressor disclosed in the above-identified Japanese Patent No. 3038681, refrigerant gas blown out through the outlet of the relief valve flows through the groove and is guided out of the cover.

Japanese Patent Application Publication No. 2010-53750 discloses yet another relief valve for a compressor. A cap is detachably mounted on the head of the valve body, and an elastic member is interposed between the cap and the head of the valve body. The cap includes a cap end having the same hexagonal shape as that of the head of the valve body, two fixing hooks extending from the opposite two sides of the cap end and bent into a U-shape and three holding pieces extending from and bent along any three sides of the cap end excluding the above two sides for the two hooks. The elastic member is formed to have a C-shaped cross-section, a predetermined thickness and an opening formed through a part of the elastic member. The cap and the elastic member are mounted on the valve body along the axial direction of the relief valve such that the elastic member covers the surface surrounding the outlet of the valve body which is opened at the head of the valve body and also that the fixing hooks of the cap are engaged with the head of the valve body with the opening of the elastic member directed in a predetermined direction. The elastic member is interposed between the head of the valve body and the cap end of the cap in a compressed state, and a passage for refrigerant gas is formed between the head of the valve body and the cap end so as to be directed toward the opening of the elastic member. According to the above-identified Japanese Patent Application Publication No. 2010-53750, refrigerant gas blown out through the outlet of the relief valve flows out of the relief valve through the opening of the C-shaped elastic member.

The cap of the relief valve according to the Japanese Patent No. 3266985 which is made of a resin material may be deteriorated, and the strength of the holding arms may be decreased. That is, the cap is subjected to the influence of the blowing pressure of refrigerant gas and of a load created due to an environmental change (especially a high temperature) and, therefore, there is a fear of deterioration of the cap. There is a further fear that the holding arms may be deformed or broken by plastic deformation or fatigue failure due to a load of refrigerant gas. As measures against the deterioration of the cap or the decrease of the strength of the holding arms, the cap may be made thick-walled, which only causes the cap to be made large in size. According to the relief valve disclosed in the above-identified Japanese Patent No. 3038681 and Japanese Patent Application Publication No. 2010-53750, the elastic member disposed between the valve body and the cover has a groove formed therein at the contact surface with the valve body, so that the flow of refrigerant gas is regulated by arranging the elastic member to the valve body by the cover in a compressed state. Thus, the elastic member is required to have sufficient thickness, which makes the cap to become large in size. Increased size of the cap causes a fear that the cap may interfere with other peripheral devices in a small engine compartment of the vehicle. In addition, extra force is required for mounting the elastic member to the valve body in a compressed state, which impairs the working efficiency in assembling of the relief valve.

The present invention is directed to provide a relief valve for a compressor which prevents the cap of the relief valve from becoming large in size and the other peripheral devices from being damaged by refrigerant gas blown through the relief valve.

SUMMARY OF THE INVENTION

In accordance with the present invention, a relief valve for a compressor includes a valve body, a relief port, a cap and a cover. The valve body includes an end and a peripheral surface. The relief port is formed in the end of the valve body and refrigerant gas is blown out through the relief port if pressure in the compressor is excessively increased. The cap includes an end and a peripheral surface engageable with the peripheral surface of the valve body. The cover includes an end, a peripheral surface engageable with the peripheral surface of the cap and an engaging portion engageable with the valve body such that the cover is prevented from moving relative to the valve body. With the cover is mounted on the valve body through the cap, the relief port is covered by the end of the cap, a first clearance is formed between the end of the cap and the end of the valve body so as to be in communication with the relief port, and a flowing passage for refrigerant gas blown out through the relief valve is formed from the relief port through the first clearance.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which:

FIGS. 5A through 5D are schematic rear views illustrating an assembling process of the relief valve of FIG. 1, wherein FIG. 5A shows a state before the cover is connected to a cap of the relief valve, FIG. 5B shows a state where the cover and the cap connected with each other are disposed on a lateral side of the valve body, FIG. 5C shows a state where the cover and the cap are being mounted on the valve body, and FIG. 5D shows a state where the cover and the cap are fixed to the valve body;

FIG. 7A and FIG. 7B are schematic rear views illustrating an assembling process of a relief valve according to a second preferred embodiment of the present invention, wherein FIG. 7A shows a state before a cover is connected to a cap of the relief valve, and FIG. 7B shows a state where the cover and the cap are connected to each other;

DETAILED DESCRIPTION OF THE PREFERRED EMBODIMENTS

Figure 1:
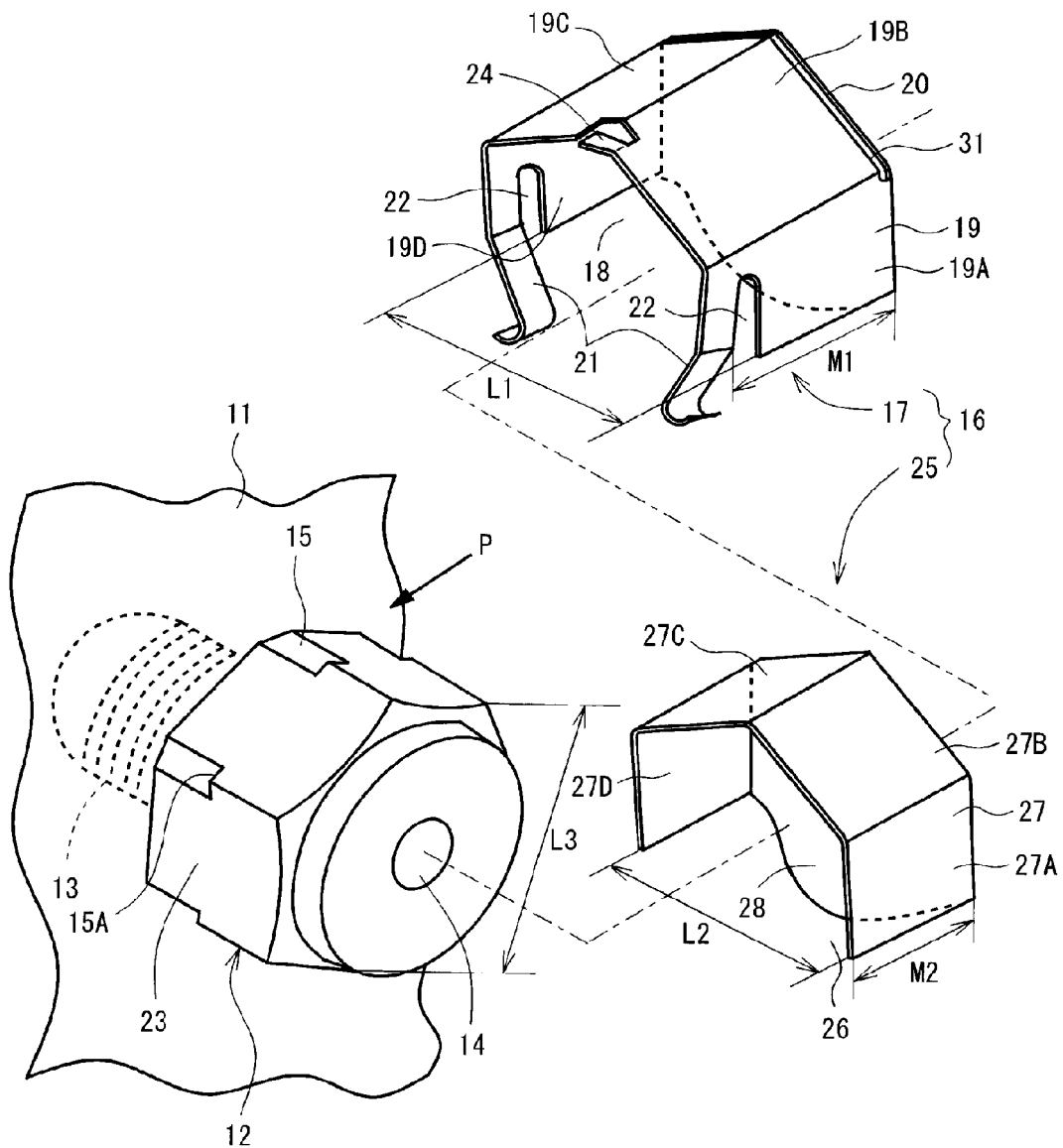
FIG. 1 is an exploded perspective view of a relief valve according to a first preferred embodiment of the present invention.
Figure 2:
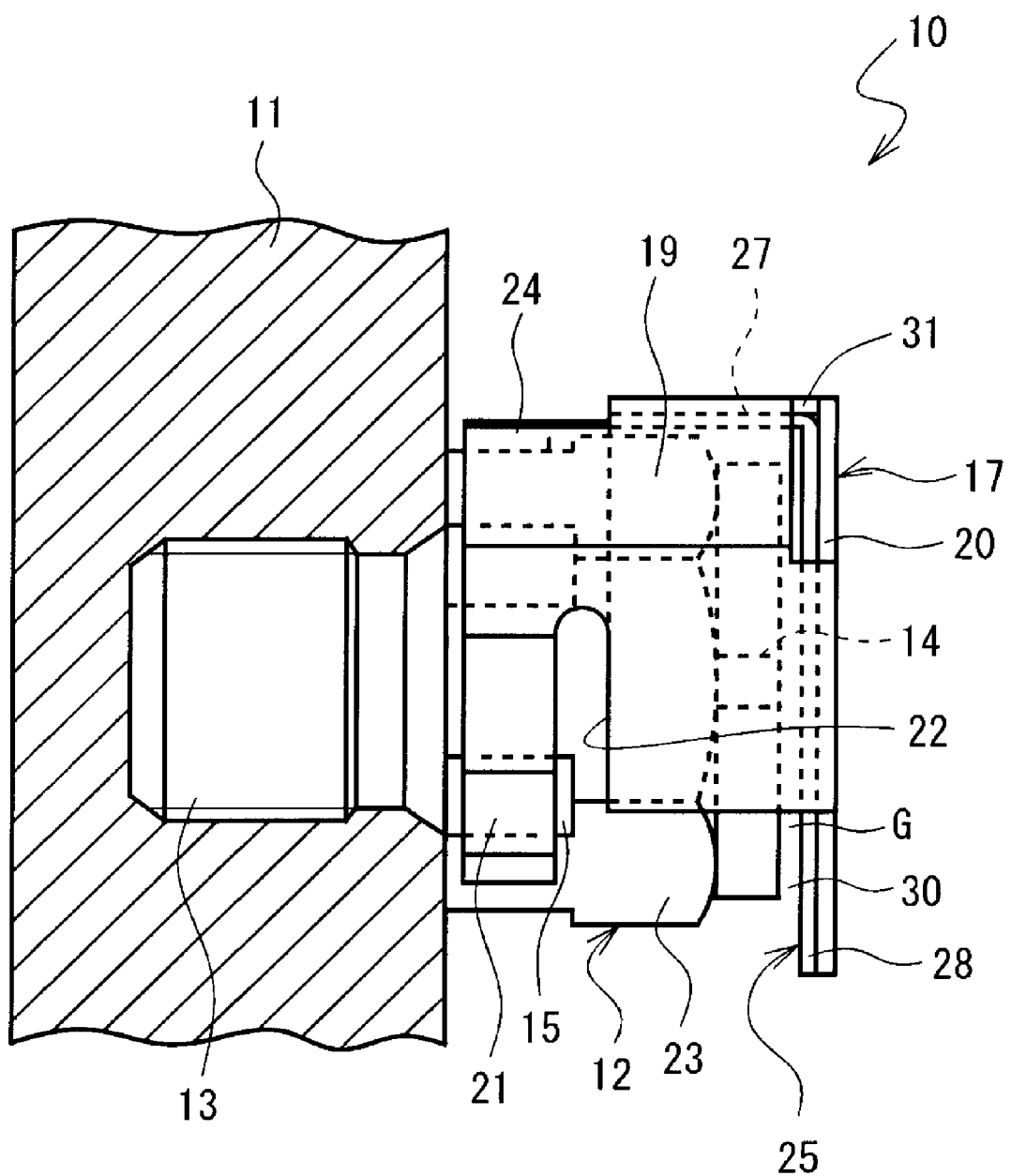
FIG. 2 is a side view of the relief valve of FIG. 1, showing a state where the relief valve is assembled and mounted on the compressor.
Figure 3:
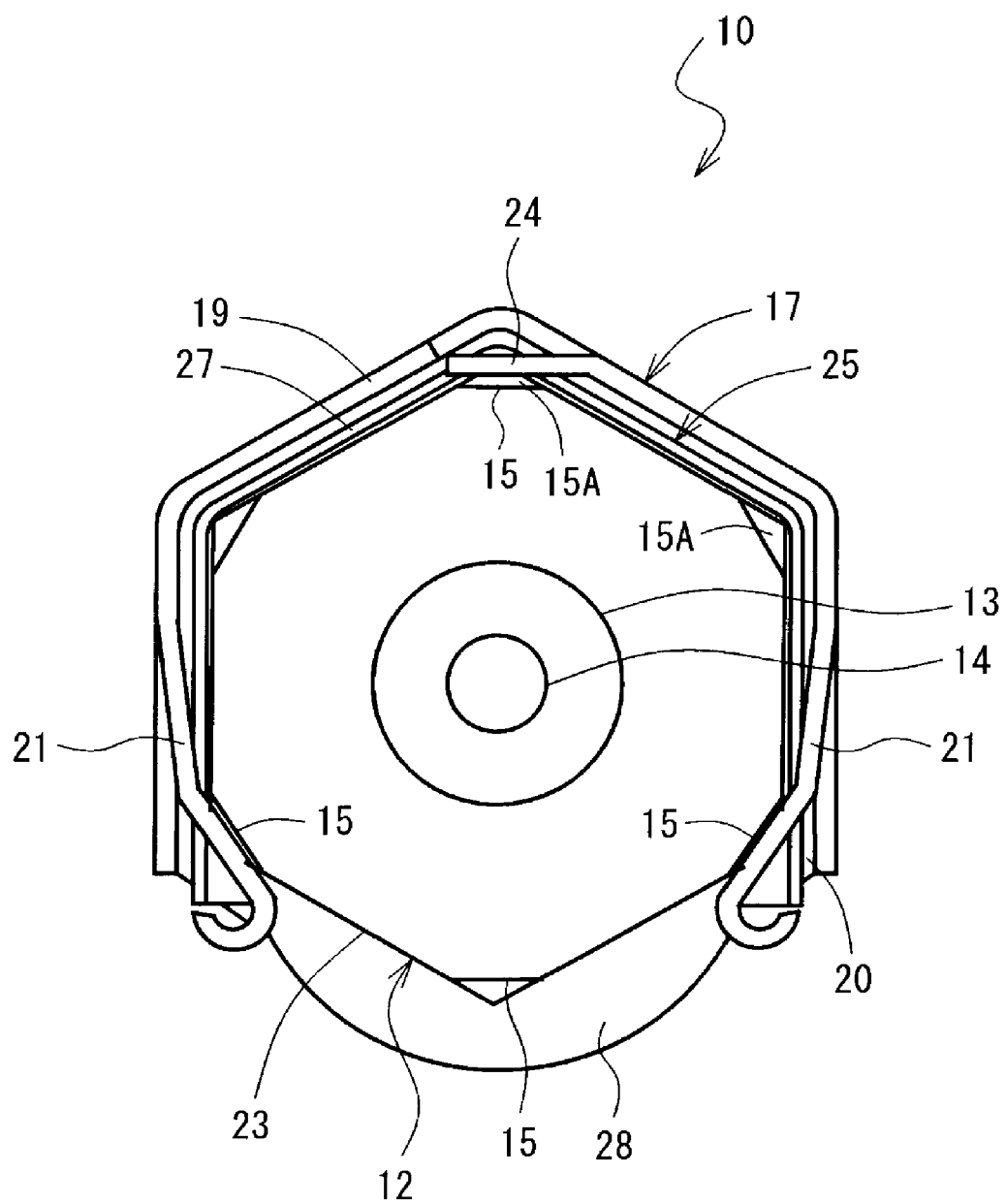
FIG. 3 is a rear view of the relief valve of FIG. 1, showing a state where the relief valve is assembled.

The following will describe a relief valve according to a first preferred embodiment of the present invention with reference to FIGS. 1 through 6. Referring to FIGS. 1 through 3, reference numeral 11 designates a housing of a compressor, and a valve body 12 having a hexagonal prism shape mounted on the outer wall of the housing 11 by a screw 13 screwed in the housing 11. The valve body 12 has a relief port 14 which is opened at the axial center of the end of the valve body 12 and through which refrigerant gas is blown. The relief port 14 formed in the end of the valve body 12 is communicable with a discharge chamber (not shown) which is formed in the housing 11. The valve body 12 of a hexagonal prism shape has an outer peripheral surface 23 having six lateral faces. A cut 15 is formed between each two adjacent lateral faces of the outer peripheral surface 23 of the valve body 12. Any three cuts 15 serve as the retaining portion engageable with a pair of holding arms 21 formed for serving as an engaging portion which will be described later. Each cut 15 is formed by chamfering a part of the lateral edge between any two adjacent lateral faces of the outer peripheral surface 23 of the valve body 12 and have a face extending substantially perpendicular to an imaginary line which connects between the axis and the lateral edge of the valve body 12, as shown in FIGS. 1 and 3. Each cut 15 extends axially of the valve body 12 for a predetermined distance from the end of the valve body 12 on the side of the screw 13 and has an end edge 15A formed at the end of the cut 15 and having a triangular surface, as viewed from the back of the valve body 12, extending perpendicular to the chamfered surface of the cut 15.

Referring to FIG. 2, numeral 10 designates a relief valve 10 that is composed of the valve body 12, a cover 17 and a cap 25 (FIG. 1). The cover 17 is formed by bending a plate and detachably mounted on the valve body 12, and the cap 25 is made of a plate and disposed between the valve body 12 and the cover 17 so as to cover the relief port 14. The cover 17 is formed so as to be fitted around the outer peripheral surface 23 of the valve body 12 and includes a cover wall 19, a cover end 20 and a pair of the holding arms 21. A cutout 18 is formed in the cover wall 19. The cover end 20 is of a substantially hexagonal shape and connected to one end of the cover wall 19, and the other end of the cover wall 19 has a pair of slits 22 and a pair of the holding arms 21 formed adjacent to the slits 22 to be engageable with any two cuts 15 of the valve body 12. In other words, the cover wall 19 corresponds to the peripheral surface of the cover 17 having a substantially regular hexagonal prism shape, and the cover end 20 corresponds to the end of the cover 17.

The cover wall 19 is formed extending from four sides of the cover end 20 having a substantially hexagonal prism shape in a direction that is perpendicular to the surface of the cover end 20. The two adjacent sides at the bottom are absent in the cover wall 19, as shown in FIG. 1, and the absence of these two sides forms the cutout 18 of the cover 17. The cutout 18 corresponds to the opening of the cover 17 formed through the peripheral surface of the cover 17. The cutout 18 is formed by removing two adjacent lateral faces of the regular hexagonal prism shape of the cover wall 19 of the cover 17. The cover wall 19 has four cover wall surfaces 19A, 19B, 19C and 19D extending from the respective four sides of the substantially hexagonal shape of the cover end 20. The cover wall surfaces 19A and 19D are located on opposite sides of the cutout 18. As shown in FIG. 1, each holding arm 21 is formed by extending from the respective cover wall surfaces 19A and 19D each continuous with respective opposite sides of the cutout 18 of the cover 17. The paired holding arms 21 provided in a part of the respective cover wall surfaces 19A and 19D are formed by being bent inwardly along middle lines such that the paired holding arms 21 are closed to each other toward the distal ends thereof. To be more specific, the bending is performed such that the distance between the distal ends of the holding arms 21 is shorter than the distance between the cover wall surfaces 19A and 19D, indicated by the width L1 in FIG. 1. In mounting the cover 17 on the valve body 12 along the direction showing by the arrow P in FIG. 1, the holding arms 21 are firmly deformed outwardly to be expanded and then the cover 17 is fitted over the valve body 12 with the holding arms 21 engaged with any two cuts 15. A fixing hook 24 is formed in the cover wall 19 at the end of the lateral edge between the cover wall surfaces 19B and 19C which are positioned opposite to the cutout 18 or the holding arms 21 to be engageable with one cut 15 of the valve body 12, as shown in FIG. 3.

Figure 4:
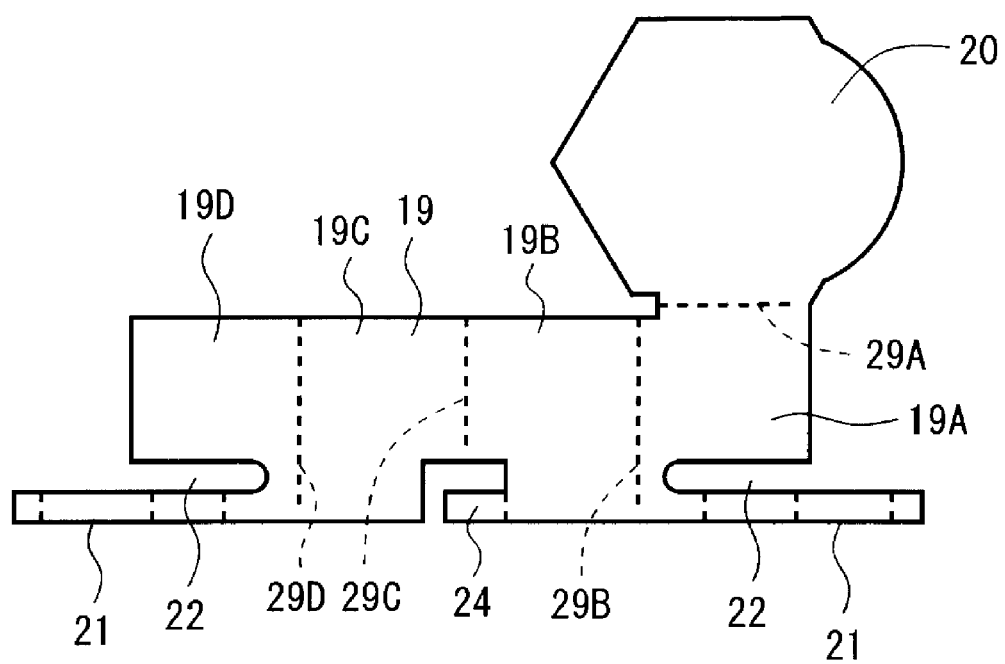
FIG. 4 is an unfolded plan view of a cover of the relief valve of FIG. 1.

The cover 17 is made of a single steel plate having elasticity, and the steel plate is used as a metal plate. Referring to FIG. 4, the steel plate for the cover 17 includes two parts, namely one part corresponding to the cover end 20 and the other part corresponding to the cover wall 19. The steel plate is bent along the dashed lines 29A through 29D in FIG. 4 thereby to form the cover 17 into a shape as shown in FIGS. 1 and 3. More particularly, the steel plate is bent along the dashed line 29A at a substantially right angle and then bent along the dashed lines 29B through 29D at an angle of about 120 degrees so that the cover wall 19 has a substantially regular hexagonal prism shape. The cover end 20 is continuous with the cover wall 19 only at one side of the cover end 20, so that a clearance 31 is formed between the cover end 20 and the cover wall 19 when the steel plate is bent appropriately, as shown in FIG. 1.

The cap 25 is engaged with the outer peripheral surface 23 of the valve body 12. The cap 25 includes a cap wall 27 and a cap end 28. A cutout 26 is formed in the cap wall 27 of the cap 25, and the cap end 28 is connected to the end of the cap wall 27 for changing the flowing direction of refrigerant gas blown out through the relief port 14. Specifically, the cap end 28 is connected to the cap wall 27 in such a way that the refrigerant gas flowing axially out through the relief port 14 is diverted to a direction that is substantially perpendicular to the axial direction of the relief port 14. The cap wall 27 corresponds to the peripheral surface of the cap 25 having a substantially regular hexagonal prism shape, and the cap end 28 corresponds to the end of the cap 25. The cap wall 27 is formed extending from four sides of the substantially hexagonal shape of the cap end 28 in a direction that is perpendicular to the surface of the cap end 28. The two adjacent sides are absent in the cap wall 27, as shown in FIG. 1, thereby forming a cutout 26 in the cap 25. The cutout 26 corresponds to the opening of the cap 25 formed through the peripheral surface of the cap 25 and is formed by removing the two adjacent lateral faces of the substantially regular hexagonal prism shape of the cap 25. The cap wall 27 has cap wall portions 27A through 27D extending from the respective four sides of the cap end 28 in a direction that is perpendicular to the surface of the cap end 28, and the cap wall portions 27A and 27D are located on opposite side of the cutout 26. With the cap 25 and the cover 17 mounted in place to the valve body 12, as shown in FIG. 2, the cap 25 and the cover 17 are arranged relative to the valve body 12 such that the cutout 26 of the cap 25 and the cutout 18 of the cover 17 coincide each other thereby to form an outlet 30 in the relief valve 10.

The cap 25 is made of a plate which is thinner than the plate for the cover 17 and has a low elasticity, and shaped by processing such as drawing, so that no clearance is formed between the cap wall 27 and the cap end 28. The cap 25 is mounted on the valve body 12 by moving the cap 25 relative to the valve body 12 in the direction of the arrow P in FIG. 1 such that the cap end 28 covers the relief port 14 and the cap wall 27 is engaged with the outer peripheral surface 23 of the valve body 12. The cover 17 is mounted over the cap 25 mounted previously on the valve body 12 in such a way that the positions of the cutout 26 of the cap 25 and the cutout 18 of the cover 17 coincide with each other.

L1 in FIG. 1 represents the width of the cover 17 as measured between the cover wall surfaces 19A and 19D located on the opposite sides of the cutout 18, and L2 represents the width of the cap 25 as measured between the cap wall portions 27A and 27D located on the opposite sides of the cutout 26, wherein the width L1 is slightly greater than the width L2. In addition, L3 represents the width of the valve body 12 as measured between two opposite surfaces of the hexagonal outer peripheral surface 23 of the valve body 12. The width L2 is substantially the same as or slightly greater than the width L3. The axial length M1 of the cover 17 as measured between the cover end 20 and the holding arm 21 in the axial direction of the cover 17 is greater than the axial length M2 of the cap wall 27 in the axial direction of the cap 25. As shown in FIG. 2, a clearance G is formed between the end of the valve body 12 having the relief port 14 and the cap end 28 when arranging the cap 25 and the cover 17 to the valve body 12, and the clearance G is in communication with the outlet 30. The clearance G is formed between the cap end 28 and the end of the valve body 12 and corresponds to a first clearance of the present invention for communication between the relief port 14 and the outlet 30. The flowing passage of refrigerant gas blown out through the relief port 14 is formed by the clearance G and the outlet 30. With the cap 25 and the cover 17 mounted on the valve body 12, the paired holding arms 21 and the fixing hook 24 are engaged with the valve body 12 at three alternate positions of the six cuts 15 formed on the valve body 12 in the circumferential direction thereof at a regular interval, as shown in FIG. 3.

The following will describe an assembling process of the relief valve 10 in which the cap 25 and the cover 17 are mounted on the valve body 12 with reference to FIGS. 5A through 5D. As shown in FIG. 5A, the cap 25 is mounted on the cover 17 for temporal connection. Specifically, the cap 25 is inserted into the cover 17 through the cutout 18 of the cover 17, as indicated by arrow in FIG. 5A. Since the width L1 is slightly greater than the width L2, the cap 25 can be inserted smoothly into the cover 17. Thus, the cover wall 19 and the cover end 20 of the cover 17 are in direct contact with the cap wall 27 and the cap end 28 of the cap 25, respectively. In this state, the cutout 18 of the cover 17 and the cutout 26 of the cap 25 coincide with each other.

Referring then to FIG. 5B, numeral 16 designates a cap unit formed by connecting the cover 17 and the cap 25 together. The cap unit 16 is set on a lateral side of the valve body 12, as shown in FIG. 5B. In FIG. 5B, the vertical direction to the sheet of FIG. 5B corresponds to the axial direction of the relief valve 10, and the radial direction relative to the axis of the relief valve 10 corresponds to the radial direction of the relief valve 10. Before mounting the cap unit 16 to the valve body 12 by moving the cap unit 16 relative to the valve body 12 of the relief valve 10 in arrow direction in FIG. 5B, the cap unit 16 is disposed relative to the valve body 12 such that the cap end 28 and the cover end 20 face the relief port 14 of the valve body 12. The cap wall 27 and the cover wall 19 are disposed so as to correspond to the valve body 12, and a pair of the holding arms 21 is disposed so as to correspond to two cuts 15, respectively.

The cap unit 16 may be mounted on the valve body 12 by pushing the cap unit 16 onto the valve body 12. This is accomplished by moving the cap unit 16 relative to the valve body 12 in arrow direction shown in FIG. 5C while allowing the distal ends of a pair of the holding arms 21 to be elastically deformed outwardly and to slide in contact with the outer peripheral surface 23 of the valve body 12. FIG. 5C shows a state of the holding arms 21 in which the distance between the distal ends of the holding arms 21 is increased to the largest extent and a part of the cap wall 27 is engaged with the outer peripheral surface of the valve body 12.

Referring to FIG. 5D, the cap unit 16 is further pushed along the valve body 12 in arrow direction, so that the holding arms 21 are in contact at the distal ends thereof with the cuts 15 located at the bottom in FIG. 5D and elastically deformed in a direction that reduces the distance between the distal ends of the holding arms 21 thereby to be engaged with the cuts 15. The fixing hook 24 of the cover 17 is engaged with the cut 15 located at the top, as shown in FIG. 5D. In this state, the cap wall 27 is engaged with the outer peripheral surface 23 of the valve body 12, and the cap end 28 is positioned in facing relation to the relief port 14. The cover 17 is prevented from moving relative to the valve body 12, or in the radial direction of the valve body 12. FIGS. 5B, 5C and 5D show an example in which the cap unit 16 is mounted on the valve body 12 from the top in the drawings. Alternatively, the cap unit 16 may be mounted on the valve body 12 in any one of six radial directions of the valve body 12.

Figure 6:
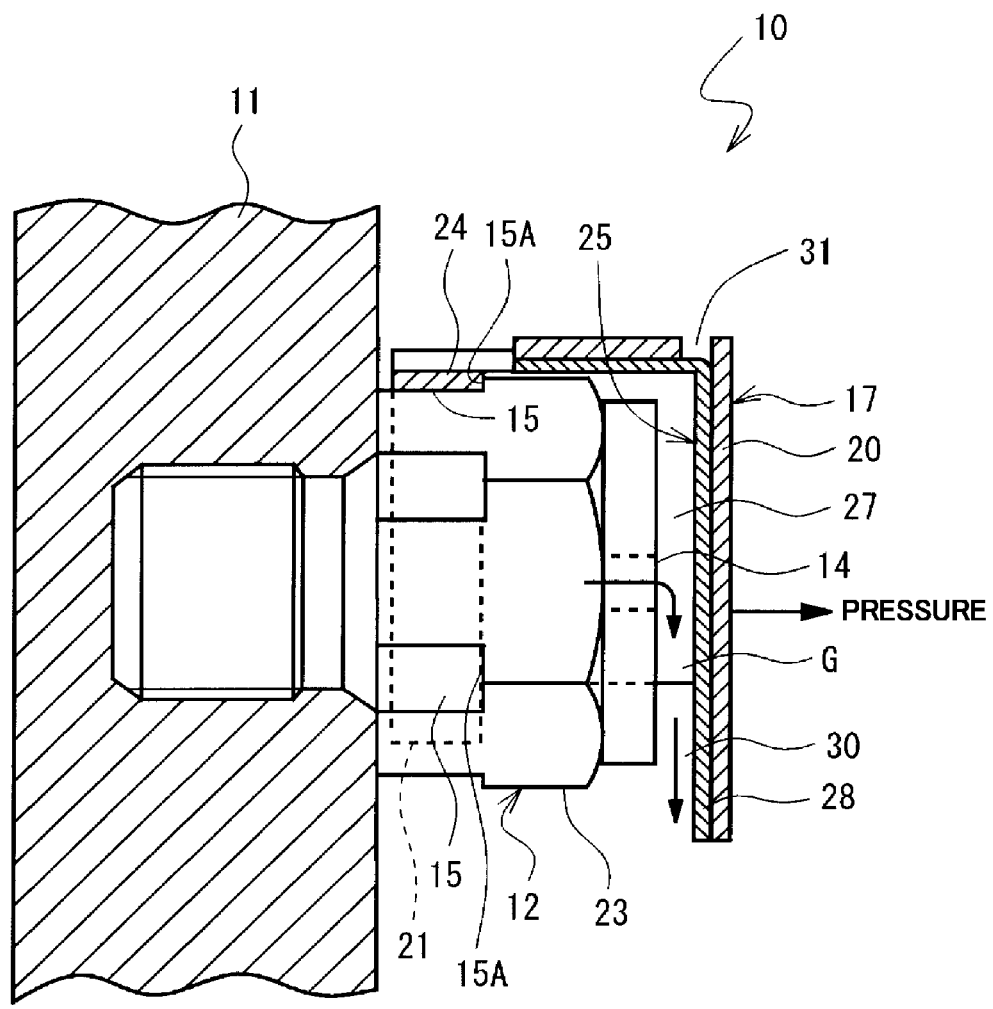
FIG. 6 is a schematic side view of the relief valve of FIG. 1, illustrating the operation of the relief valve when refrigerant gas is being blown through the relief valve.

The following will describe the operation of the above-described relief valve 10. In a compressor equipped with the above-described relief valve 10 in which the cap unit 16 is mounted on the valve body 12, if the pressure in the compressor is excessively increased, the relief valve 10 is actuated to allow a part of the excessively high-pressured refrigerant gas to be blown out through the relief port 14. Referring to FIG. 6, the refrigerant gas blown out through the relief port 14 impinges against the cap end 28 of the cap 25 and is turned to a direction substantially perpendicular to the surface of the cap end 28, so that the refrigerant gas flows to the outlet 30.

Pressure of the refrigerant gas being blown through the relief port 14 acts on the cap end 28 so as to urge the cap end 28 in a direction away from the relief port 14 or in the axial direction of the valve body 12, so that the cap unit 16 is moved in the axial direction of the valve body 12 to a position where the holding arms 21 and the fixing hook 24 of the cover 17 are brought into engagement with the end edges 15A of the cuts 15. Thus, the valve body 12 is restricted from moving further in the axial direction thereof. This state of the relief valve 10 is shown in FIG. 6, where the clearance G between the end of the valve body 12 and the cap end 28 is increased to the largest extent.

Since the cap 25 disposed to cover the relief port 14 is formed by drawing operation as mentioned earlier, no clearance is made between the cap wall 27 and the cap end 28. Thus, the refrigerant gas blown out from the relief port 14 flows in the clearance G and is guided to the outlet 30 to be blown out of the relief valve 10. Refrigerant gas may be prevented from leaking out through any part of the relief valve 10 other than the outlet 30. The outlet 30 may be formed in the relief valve 10 at any position in the circumference of the relief port 14.

The cap 25 is fixedly mounted on the valve body 12 for covering the relief port 14, and the cover 17 is fixedly mounted on the cap 25 on the valve body 12. According to the relief valve 10 thus constructed, the flowing direction of refrigerant gas may be regulated such that the refrigerant gas blown out through the relief port 14 will not impinge against peripheral devices. The cap 25 and the cover 17 may be made of a thin plate. Additionally, the length of the flowing passage for refrigerant gas as measured in axial direction of the valve body 12 corresponds to the clearance G, so that the projection of the relief valve 10 in the axial direction of the valve body 12 may be reduced. The member of the relief valve 10 for preventing leakage of the refrigerant gas and the member for fixing the member for preventing leakage to the valve body 12 are provided separately, so that load applied to the members may be dispersed. Thus, the relief valve 10 may maintain the desired strength while preventing an increase of the size of the relief valve 10 and a damage to the peripheral devices by impinging refrigerant gas.

According to the relief valve 10 of the first preferred embodiment, the following advantageous effects are obtained.

(1) The cap 25 for covering the relief port 14 of the valve body 12 is fixedly mounted on the valve body 12, and the cover 17 is fixedly mounted on the cap 25 on the valve body 12, so that flow of refrigerant gas blown out from the relief valve 10 is regulated such that the refrigerant gas will not impinge against any peripheral devices. The cap 25 and the cover 17 may be made of a thin plate, and the flowing passage for refrigerant gas blown out from the relief valve 10 extends from the valve body 12 in the axial direction thereof only for a distance that corresponds to the clearance G, so that the projection of the relief valve 10 in the axial direction of the valve body 12 may be reduced as compared to the conventional relief valve. Thus, the relief valve 10 maintains the desired strength while preventing an increase of the size of the relief valve 10 and a damage to the peripheral devices by impinging refrigerant gas.

(2) The cap 25 disposed for covering the relief port 14 includes the cap end 28 and the cap wall portions 27A through 27D extending from the four sides of the cap end 28 in the direction perpendicular to the surface of the cap end 28 by drawing operation. In the cap 25, therefore, no clearance is formed between the cap wall portions 27A through 27D and the cap end 28, and refrigerant gas blown out through the relief port 14 flows through the clearance G while being guided toward the outlet 30, and then blown out of the relief valve 10. Therefore, the flow of refrigerant gas may be regulated by the cap 25 and leakage of refrigerant gas from any part of the relief valve 10 other than the outlet 30 may be prevented. In addition, the outlet 30 formed by the peripheral surface of the cover 17 is used for forming the refrigerant gas passage, and the flowing direction of refrigerant gas blown out through the relief port 14 may be regulated by such a simple structure. The cap 25 and the cover 17 are connected to each other such that the positions of the cutout 18 of the cap 25 and the cutout 18 of the cover 17 coincide with each other, so that the refrigerant gas blown out through the relief port 14 may be guided to the outlet 30 through the clearance G and blown out of the compressor through the outlet 30, effectively.

(3) The cap 25 is temporarily connected to the cover 17 thereby to form the cap unit 16, and then the cap unit 16 is mounted on the valve body 12 by moving the cap unit 16 relative to the valve body 12 in the radial direction of the relief valve 10. The outlet 30 formed in the relief valve 10 by coinciding the cutout 18 of the cover 17 with the cutout 26 of the cap 25 may be provided at any one of six positions along the circumferential direction of the valve body 12 by changing angular position of the cap unit 16 relative to the valve body 12. Thus, the position of the outlet 30 is changeable depending on the surrounding condition so that the outlet 30 may be set at an optimum position for protecting the peripheral devices against the refrigerant gas blown out from the relief valve 10, thereby improving reliability of the peripheral devices.

(4) The paired holding arms 21 and the fixing hook 24 are formed in the cover 17 for engagement with the cuts 15 of the valve body 12. The holding arms 21 and the fixing hook 24 are engaged with the valve body 12 at three alternate positions of the six cuts 15 formed in the valve body 12 in the circumferential direction of the valve body 12 at a regular interval. Thus, the cover 17 is prevented from being removed from the valve body 12 under the influence of refrigerant gas blown out through the relief port 14 and pressing against the cover 17. Therefore, the cap 25 is easily mounted on the valve body 12 by moving the cap 25 relative to the valve body 12 in the radial direction of the valve body 12, and the flowing direction of refrigerant gas blown out through the relief port 14 may be regulated by such a easily manufacturable structure.

(5) The cap 25 is temporarily connected to the cover 17 thereby to make the cap unit 16 and then the cap unit 16 is fixedly mounted on the valve body 12. The cap unit 16 may be formed manually and easily mounted fixedly to the valve body 12 by moving the cap unit 16 relative to the valve body 12 along the radial direction of the relief valve 10. Thus, the assembling process of the relief valve 10 is made easier and the assembling time of the relief valve 10 may be reduced.

(6) The cover 17 is formed by bending a plate having elasticity, which helps to simplify the manufacture of the cover 17. The cap 25 is made of a thin plate having a small elasticity and formed by drawing operation, which contributes to simplifying the manufacture of the cap 25.

(7) In mounting the cover 17 on the cap 25 by moving the cover 17 relative to the cap 25 in the radial direction of the relief valve 10, the distal ends of the holding arms 21 are expanded away from each other by the outer peripheral surface 23 of the valve body 12 and then moved inward thereby to be engaged with the cuts 15. Thus, the cover 17 can be held firmly on the valve body 12 without increasing the length of the cover 17 in the axial direction of the valve body 12.

(8) The axial length M1 of the cover 17 between the cover end 20 and the holding arms 21 is greater than the axial length M2 of the cap wall 27 of the cap 25. Thus, when the cover 17 is mounted on the valve body 12 by moving the cover 17 relative to the valve body 12 in the radial direction of the valve body 12, the holding arms 21 of the cover 17 and the cap wall 27 of the cap 25 are in contact with each other, so that the holding arms 21 are prevented from being deformed by the cap wall 27 of the cap 25. Therefore, the mounting of the cover 17 may be performed by a relatively small force.

The following will describe a cap unit 40 for a relief valve according to a second preferred embodiment of the present invention with reference to FIGS. 7A and 7B. The second preferred embodiment differs from the first preferred embodiment in that the shape of the cover 17 of the first preferred embodiment is modified, but the rest of the structures is substantially the same as that of the first embodiment. For the convenience of explanation, common or similar elements or parts of the second preferred embodiment are designated by the same reference numerals as those used in the first embodiment. Therefore, the description of such elements or parts will be omitted and only the modifications will be described.

As shown in FIG. 7A, reference numeral 41 designates a cover, and the cover 41 includes a cover wall 43 having a cutout 42 formed in a part of the cover wall 43, a cover end 44 and a pair of holding arms 45. The cover 41 is of substantially the same structure as the cover 17 of the first preferred embodiment. L4 in FIG. 7A represents the width of the cover 41 between the cover wall surfaces 43A and 43D which are located on opposite sides of the cutout 42 of the cover 41 and face each other. L2 in FIG. 7A represents the width of the cap 25 between the cap wall portions 27A and 27D which are located on opposite sides of the cutout 26 and face each other. The width L4 is slightly smaller than the width L2. As shown in FIG. 7A, the cover wall surfaces 43A and 43D are formed with such an inclination that the width between the cover wall surfaces 43A and 43D is decreased toward the cutout 42. The width L4 represents the smallest width between the cover wall surfaces 43A and 43D. Therefore, the cover wall surfaces 43A and 43D are inclined such that the distance between the cover wall surfaces 43A and 43D are decreased to the cutout 42.

In connecting the cap 25 to the cover 41, the cap 25 is inserted into the cover 41 from the cutout 42 or through the cutout 42. Though the width L4 is slightly smaller than the width L2, the width L4 is increased to be larger than the width L2 by causing the cover wall surfaces 43A and 43D to be elastically deformed outwardly thereby to expand the distance between the cover wall surfaces 43A and 43D when the cap 25 is inserted into the cover 41 which pushing the cover wall surfaces 43A and 43D outwardly.

As a result, the cap unit 40 is formed by thus connecting the cap 25 and the cover 41. The cap wall portions 27A and 27D of the cap 25 is pressed inwardly by the elasticity of the cover wall surfaces 43A and 43D of the cover 41 and, therefore, the cap wall portions 27A and 27D may be held securely by the cover wall surfaces 43A and 43D. Though not shown in the drawing, the cap unit 40 may be mounted on the valve body 12 by moving the cap unit 40 relative to the valve body 12 in the radial direction of the valve body 12, as in the case of the first preferred embodiment. The cover 41 and the cap 25 may be handled as one unit, which helps to further simplify the assembling of the relief valve 10. The present second preferred embodiment also offers the advantageous effects (1) through (8) mentioned in connection with the first preferred embodiment.

The following will describe a relief valve according to a third preferred embodiment of the present invention with reference to FIGS. 8A, 8B, 9 and 10. The third preferred embodiment differs from the first preferred embodiment in that the shape of the cap 25 of the first preferred embodiment is modified, but the rest of the structure is substantially the same as that of the first preferred embodiment. For the convenience of explanation, common or similar elements or parts of the third preferred embodiment are designated by the same reference numerals as those used in the first preferred embodiment. Therefore, the description of such elements or parts will be omitted and only the modifications will be described.

Figure 8A:
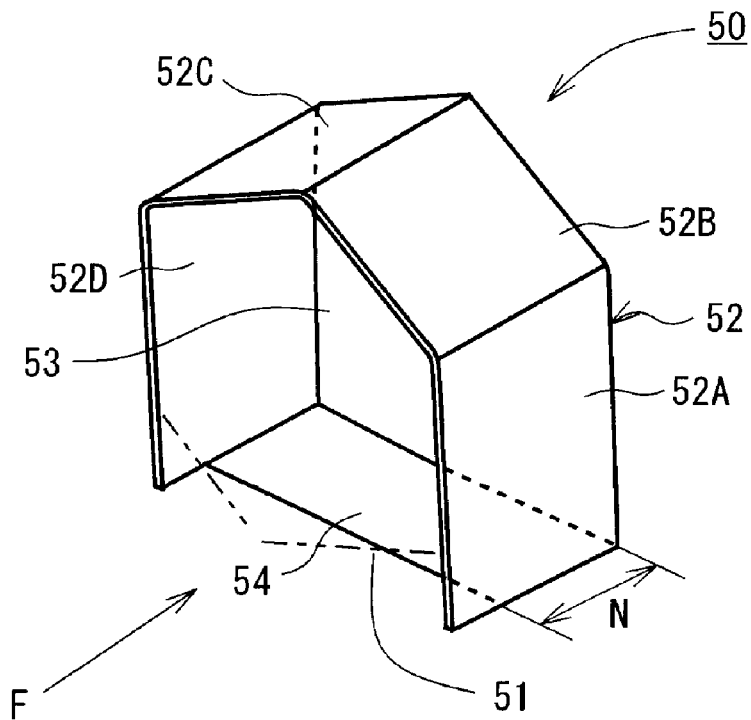
FIG. 8A is a perspective view of a cap of a relief valve according to a third preferred embodiment.
Figure 8B:
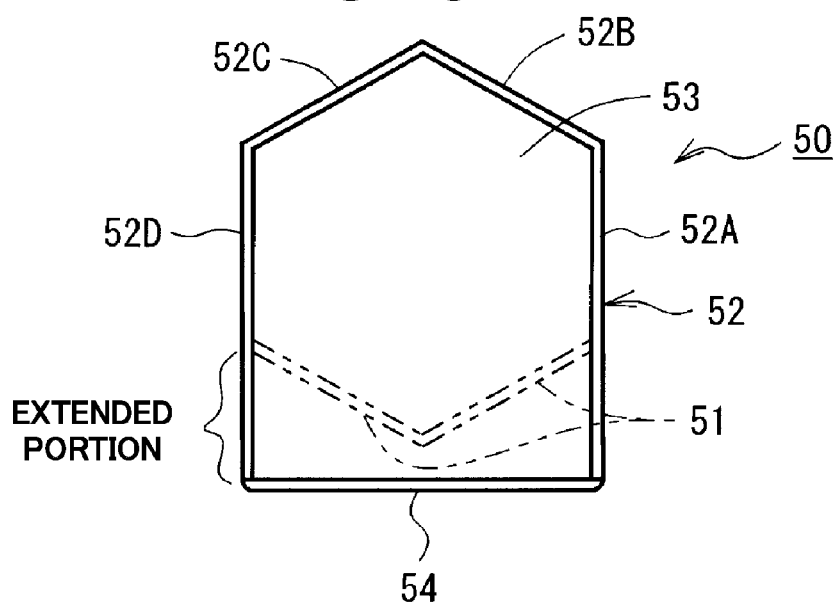
FIG. 8B is a side view of the cap of the relief valve as seen in the direction of the arrow F of FIG. 8A.
Figure 9:
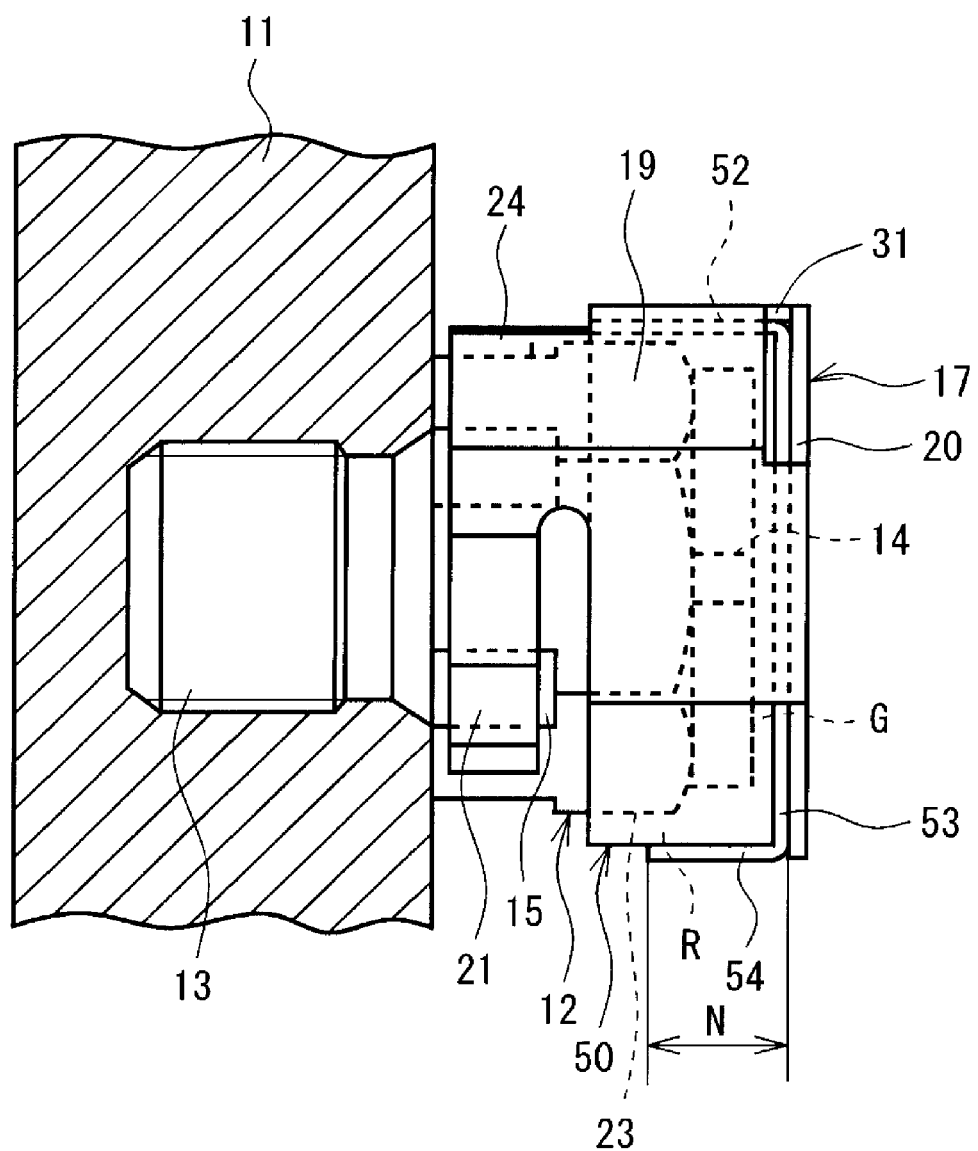
FIG. 9 is a side view of the relief valve according to the third preferred embodiment in a state where the relief valve is mounted on the compressor.

Referring to FIGS. 8A and 8B, the cap 50 includes a cap wall 52 and a cap end 53. The cap 50 has formed therein a cutout 51. As shown in FIG. 9, the cap 50 is engaged at the cap wall 52 thereof with the outer peripheral surface 23 of the valve body 12. The cap end 53 is formed at one end of the cap wall 52 and used for diverting the flowing direction of refrigerant gas blown out through the relief port 14 of the valve body 12 to the direction that is perpendicular to the axis of the valve body 12. The cap wall 52 corresponds to the peripheral surface of the regular hexagonal column shape of the cap 50, and the cap end 53 corresponds to the end of the cap 50.

The cap wall 52 is formed extending from four sides of the substantially hexagonal surface of the cap end 53 in a direction that is perpendicular to the cap end 53, the two adjacent sides at the bottom are absent in the cap wall 52, as shown in FIG. 8A, and the absence of these two adjacent sides forms the cutout 51. The cutout 51 of the cap 50 corresponds to the opening of the cap 50 formed in the peripheral surface. The cap 50 has a substantially regular hexagonal column shape without having two adjacent lateral faces. The cap wall 52 has cap wall portions 52A, 52B, 52C and 52D extending from four sides of the cap end 53 in a direction perpendicular to the cap end 53. The cap wall portions 52A and 52D are located on the opposite sides of the cutout 51. As shown in FIG. 8B, the cap wall portions 52A, 52D formed extending as one side are of the peripheral surface of the substantially hexagonal column shape of the cap wall 52 and extend further on the side of the cutout 51 as an extended surface.

As shown in FIGS. 8A and 8B, the cap end 53 is formed extending on the side of the cutout 51 or through the cutout 51, and the end of the cap end 53 on the side of the cutout 51 is bent to form a bent portion 54. No clearance is formed between the bent portion 54 and the cap wall portions 52A, 52D. The bent portion 54 serves as a flow turning plate formed at the edge of the opening of the cap 50. The cap 50 is formed such that the bent portion 54 is not in contact with the outer peripheral surface 23 of the valve body 12 when the cap 50 is mounted on the valve body 12. The axial length N of the bent portion 54 in FIG. 8A is greater than the axial length of the clearance G which will be described later. The peripheral surface of the cap 50 is formed by the cap wall portions 52B and 52C, and the cap wall portions 52A and 52D each of which has the extended surface and the bent portion 54. The cap wall portions 52B and 52C and the cap wall portions 52A and 52D excluding the extended portions are engaged with the outer peripheral surface 23 of the valve body 12.

Referring to FIG. 9, the cap 50 is mounted on the valve body 12 by moving the cap 50 relative to the valve body 12 in the axial direction of the valve body 12 in such a way that the cap end 53 covers the relief port 14, and also that the cap wall 52 is engaged with the outer peripheral surface 23 of the valve body 12. The cover 17 is mounted on the valve body 12 by moving the cover 17 relative to the valve body 12 in the radial direction of the valve body 12. The mounting of the cover 17 is done in such a way that the cover 17 covers the cap 50 mounted on the valve body 12 and that the positions of the cutout 51 of the cap 50 and the cutout 18 of the cover 17 coincide with each other.

Figure 10:
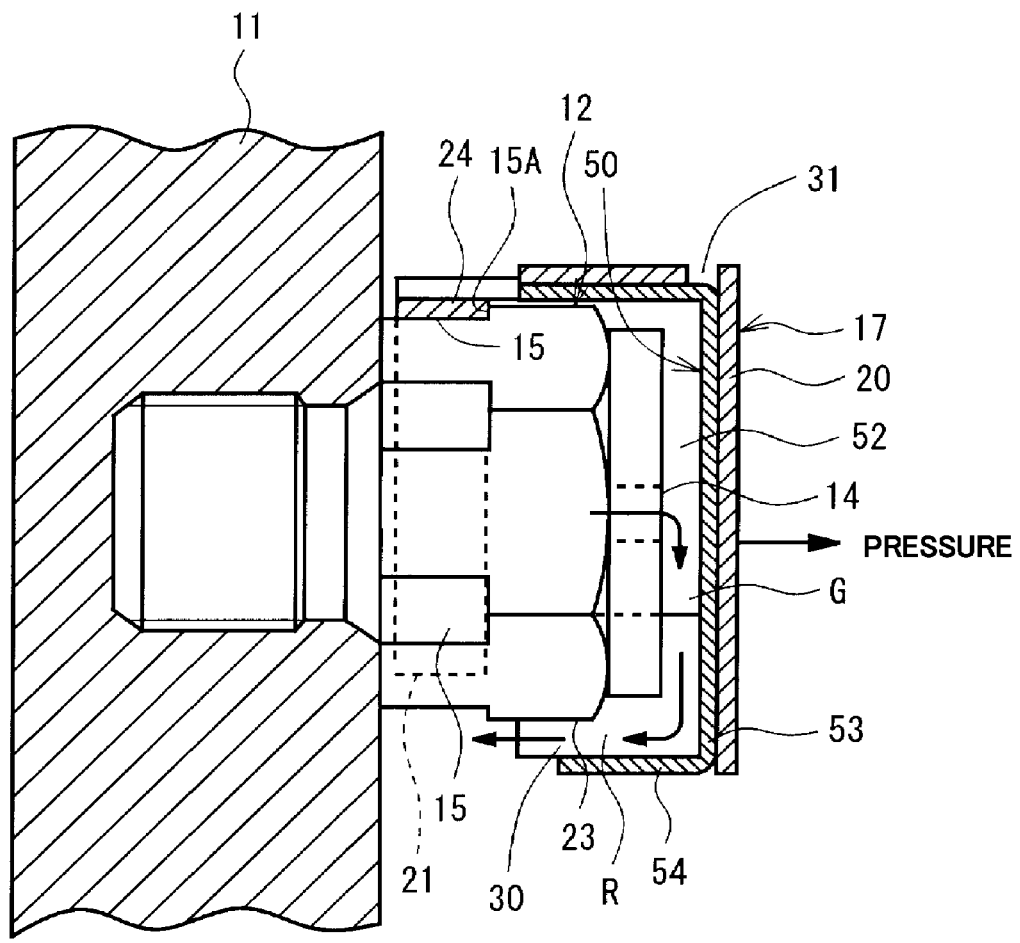
FIG. 10 is a schematic side view of the relief valve of FIG. 9, illustrating the operation of the relief valve when refrigerant gas is being blown through the relief valve.

Referring to FIGS. 9 and 10, with the cap 50 and the cover 17 mounted on the valve body 12, the clearance G is formed between the cap end 53 and the end of the valve body 12 in which the relief port 14 is formed. A clearance R is formed between the outer peripheral surface 23 of the valve body 12 and the bent portion 54 so as to be opened toward the housing 11 of the compressor. The clearance R serves as a second clearance and formed in communication with the clearance G. In the third preferred embodiment, the flowing passage for refrigerant gas blown out from the relief port 14 is formed through the clearances R and the clearance G.

Referring to FIG. 10, refrigerant gas blown out from the relief port 14 and flowing in the clearance G is guided toward the bent portion 54 of the cap 50, and the flowing direction of the refrigerant gas is changed by the bent portion 54 so that the refrigerant gas flows toward the housing 11 of the compressor through the clearance R. The outlet 30 is opened toward the housing 11 on which the valve body 12 is mounted. Thus, refrigerant gas is prevented from impinging against the peripheral devices more effectively. No clearance is formed between the bent portion 54 and the cap wall portions 52A, 52D of the cap 50. Thus, refrigerant gas blown out through the relief port 14 and flowing through the clearances G and R is directed toward the housing 11 of the compressor without leaking out through any other part of the valve body 12. This effect is achieved irrespectively of the angular position of the cover 17 relative to the valve body 12. The advantageous effects (4) and (6) through (8) of the first preferred embodiment are achieved also in the present third preferred embodiment and the description of such effects will be omitted.

Figure 11A:
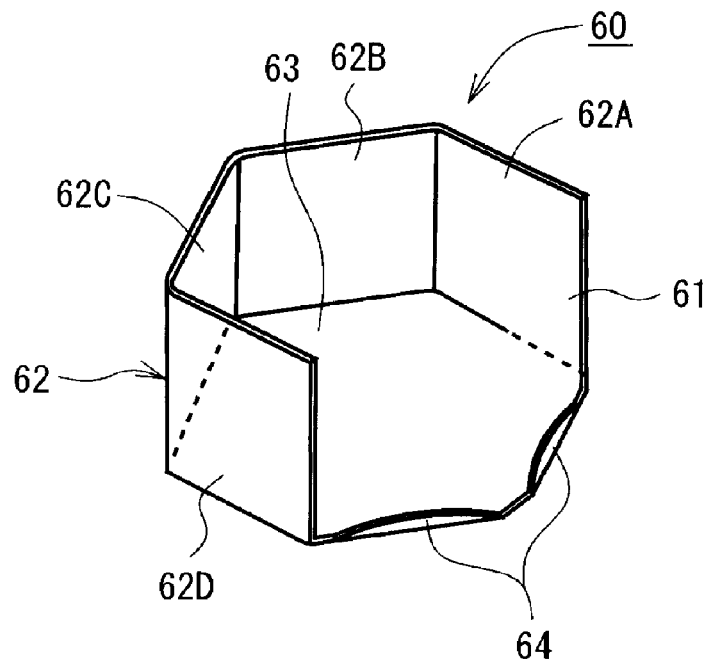
FIG. 11A is a perspective view of a cap of a relief valve according to a fourth preferred embodiment.
Figure 11B:
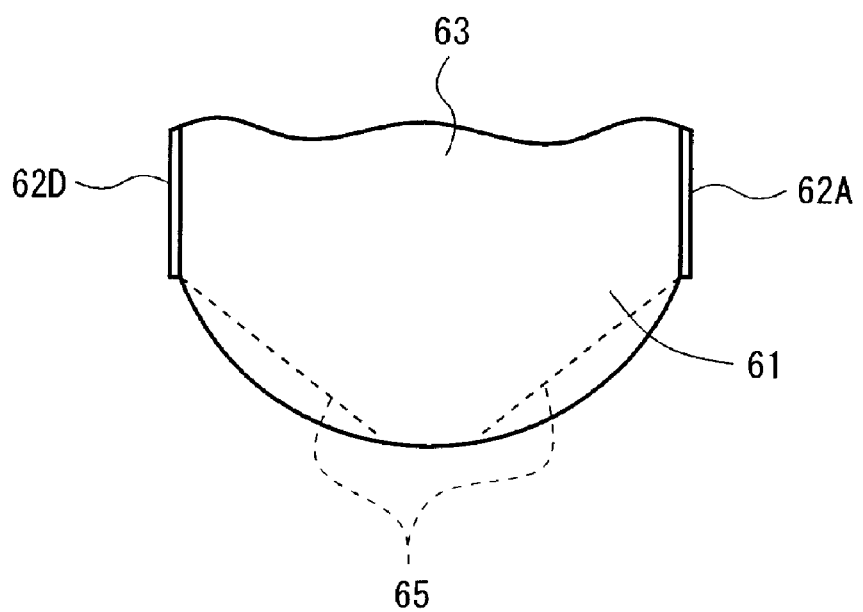
FIG. 11B is a partially enlarged plan view of the cap of FIG. 11A in a state before the cap is formed with curved edges.
Figure 12:
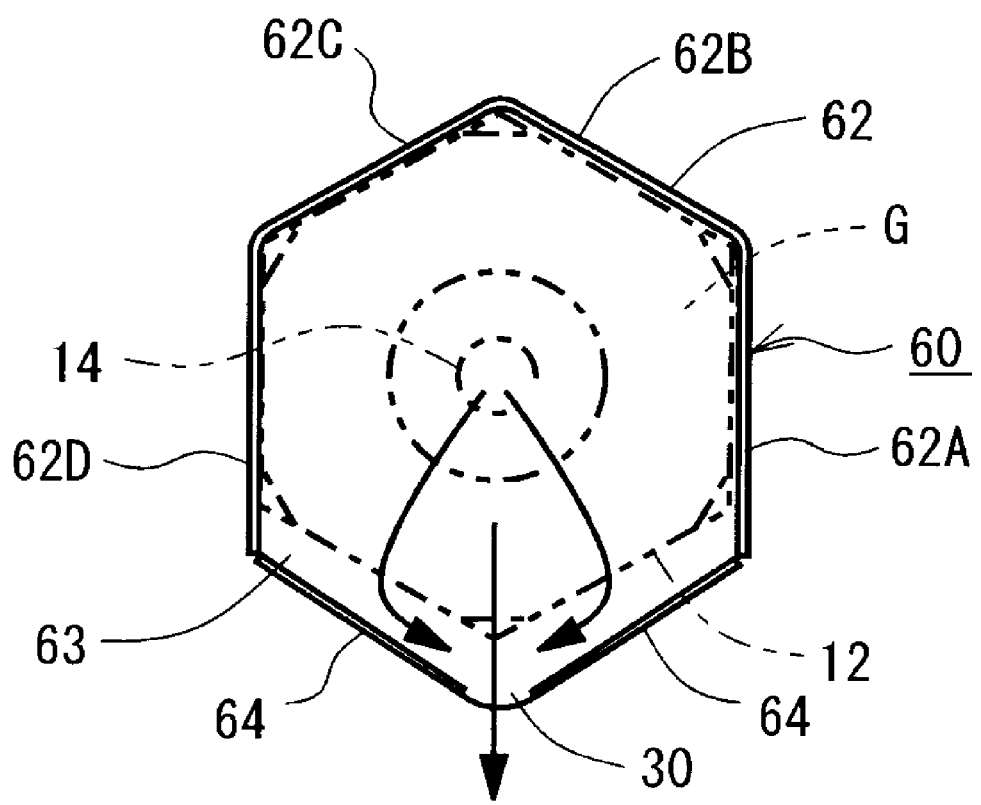
FIG. 12 is a schematic view of a relief valve according to the fourth preferred embodiment illustrating the operation of the relief valve when refrigerant gas is being blown through the relief valve as seen from the rear of the relief valve.

The following will describe a relief valve according to a fourth preferred embodiment of the present invention with reference to FIGS. 11 and 12. The fourth preferred embodiment differs from the first preferred embodiment in that the shape of the cap 25 of the first preferred embodiment is modified, but the rest of the structure is substantially the same as that of the first preferred embodiment. For the convenience of explanation, common or similar elements or parts of the fourth preferred embodiment are designated by the same reference numerals as those used in the first preferred embodiment. Therefore, the description of such elements and parts will be omitted and only the modifications will be described.

Referring to FIG. 11A, numeral 60 designates a cap that includes a cap wall 62 having formed therein a cutout 61 and a cap end 63 formed in connection with the cap wall 62. The cap 60 is of substantially the same structure as the cap 25 of the first preferred embodiment. As shown in FIG. 11A, the cap end 63 is formed with curved edges 64. The curved edges 64 are formed by bending the edge of the cap end 63 along the dashed lines 65 in FIG. 11B toward the cutout 61 such that the curved edges 64 are not in contact with the outer peripheral surface 23 of the valve body 12 when the cap 60 is mounted on the valve body 12, as shown in FIG. 12. The extended length of the curved edges 64 in the axial direction of the valve body 12 is greater than the length of the clearance G in the axial direction of the valve body 12. The outlet 30 is formed in the relief valve 10 between the curved edges 64 of the cap 60 when the cap 60 is mounted on the valve body 12.

The cap 60 is mounted on the valve body 12 by moving the cap 60 relative to the valve body 12 in the axial direction of the valve body 12 such that the cap end 63 covers the relief port 14 and the cap wall 62 is engaged with the outer peripheral surface 23 of the valve body 12. The cover 17 is assembled to the valve body 12 by moving the cover 17 relative to the valve body 12 in the radial direction of the valve body 12 such that the cover 17 covers the cap 60 and the positions of the cutout 61 of the cap 60 and the cutout 18 of the cover 17 coincide with each other.

Referring to FIG. 12, refrigerant gas blown out through the relief port 14 flows to the outlet 30 through the clearance G. The curved edges 64 of the cap end 63 function to guide the refrigerant gas toward the outlet 30 without allowing the refrigerant gas to be dispersed radially of the valve body 12, as shown in FIG. 12. Thus, the flowing direction of refrigerant gas blown out through the relief port 14 may be regulated toward the outlet 30. The advantageous effects (1) through (4) and (6) through (8) of the first preferred embodiment are achieved also in the present fourth preferred embodiment and the description of such effects will be omitted.

Figure 13:
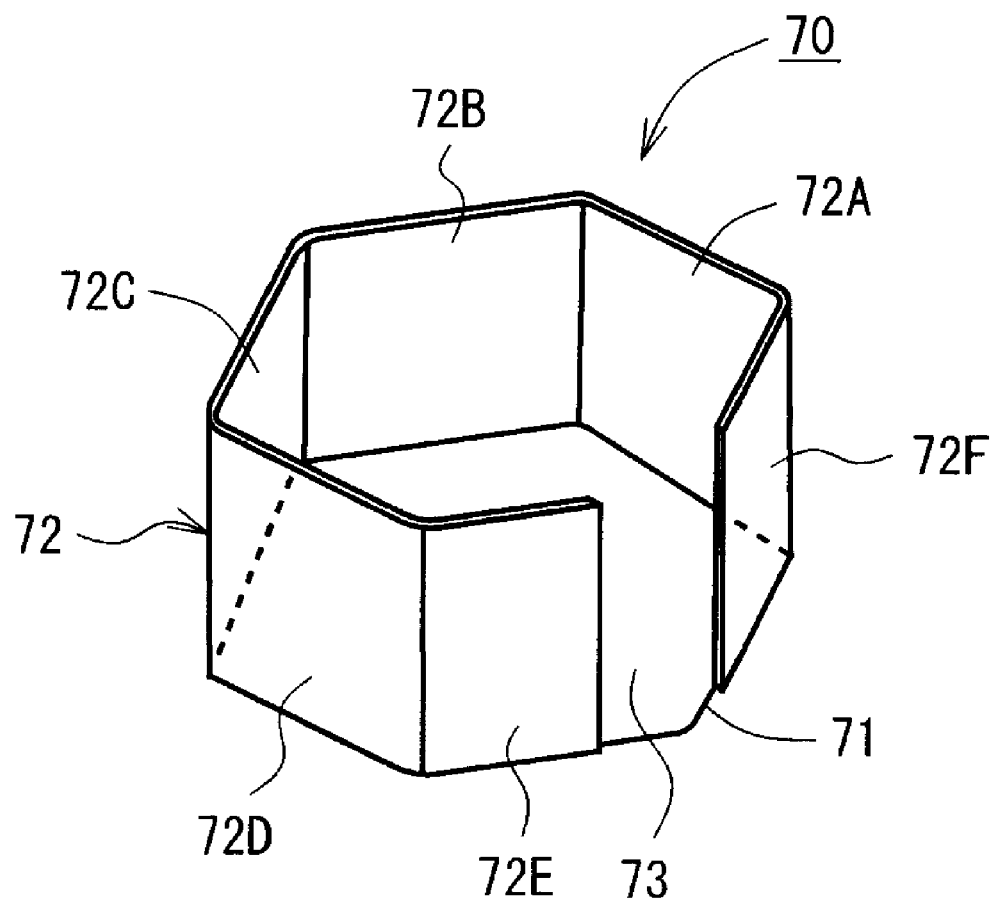
FIG. 13 is a perspective view of a cap of a relief valve according to a fifth preferred embodiment.
Figure 14:
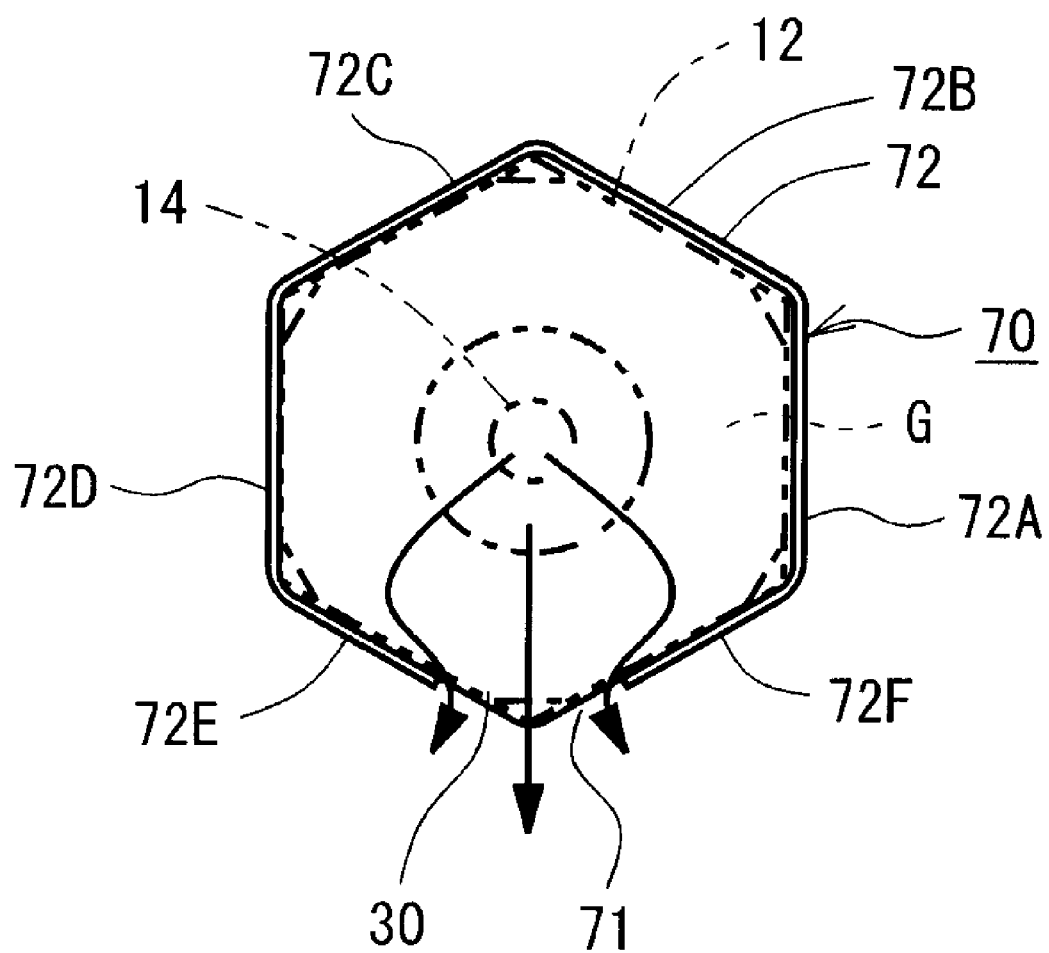
FIG. 14 is a schematic view of the relief valve of FIG. 13, illustrating the operating of the relief valve when refrigerant gas is being blown through the relief valve.

The following will describe a relief valve according to a fifth preferred embodiment of the present invention with reference to FIGS. 13 and 14. The fifth preferred embodiment differs from the first preferred embodiment in that the shape of the cap 25 of the first preferred embodiment is modified, and the rest of the structures is substantially the same as that of the first preferred embodiment. For the convenience of explanation, common or similar elements or parts of the fifth preferred embodiment are designated by the same reference numerals as those used in the first preferred embodiment. Therefore, the description of such elements and parts will be omitted and only the modifications will be described.

Referring to FIG. 13, the cap 70 includes a cap wall 72 engageable with the outer peripheral surface 23 of the valve body 12 and having a cutout 71, and a cap end 73 formed in connection with the cap wall 72 for turning the flowing direction of refrigerant gas blown out through the relief port 14 to a direction that is perpendicular to the axial direction of the valve body 12. The cap wall 72 corresponds to the peripheral surface of the regular hexagonal column shape of the cap 70, and the cap end 73 corresponds to the end of the cap 70.

The cap wall 72 is formed extending from six sides of the regular hexagonal shape of the cap end 73 in a direction that is perpendicular to the surface of the cap end 73. The cap wall 72 has cap wall portions 72A, 72B, 72C, 72D, 72E and 72F extending from six sides of the regular hexagon of the cap end 73, and a cutout 71 is formed in the cap wall 72 by cutting a part of the cap wall 72 between the cap wall portions 72E and 72F. The cutout 71 corresponds to the opening formed in the peripheral surface of the cap 70. The cover 17 and the cap 70 are assembled together so that the positions of the cutout 18 of the cover 17 and the cutout 71 of the cap 70 coincide with each other, thereby forming the outlet 30.

Though not shown in the drawing, the cap 70 is mounted on the valve body 12 by moving the cap 70 relative to the valve body 12 in the axial direction of the valve body 12 such that the cap end 73 covers the relief port 14 and the cap wall 72 is engaged with the outer peripheral surface 23 of the valve body 12. The cover 17 is mounted on the valve body 12 by moving the cover 17 relative to the valve body 12 in the radial direction of the valve body 12 so that the cover 17 covers the cap 70 mounted on the valve body 12 from the top of the cap 70 and that the positions of the cutout 71 of the cap 70 and the cutout 18 of the cover 17 coincide with each other.

Referring to FIG. 14, refrigerant gas blown out through the relief port 14 flows toward the outlet 30 through the clearance G. Because of the provision of the cutout 71 of the cap 70 formed between the cap wall portions 72E and 72F, the refrigerant gas flows out through the outlet 30, as indicated by arrows in FIG. 14. Therefore, the flowing direction of refrigerant gas blown out through the relief port 14 may be regulated toward the outlet 30. The other advantageous effects (1), (3), (4) and (6) through (8) of the first preferred embodiment are achieved also in the present fifth preferred embodiment and the description of such effects will be omitted.

Figure 15:
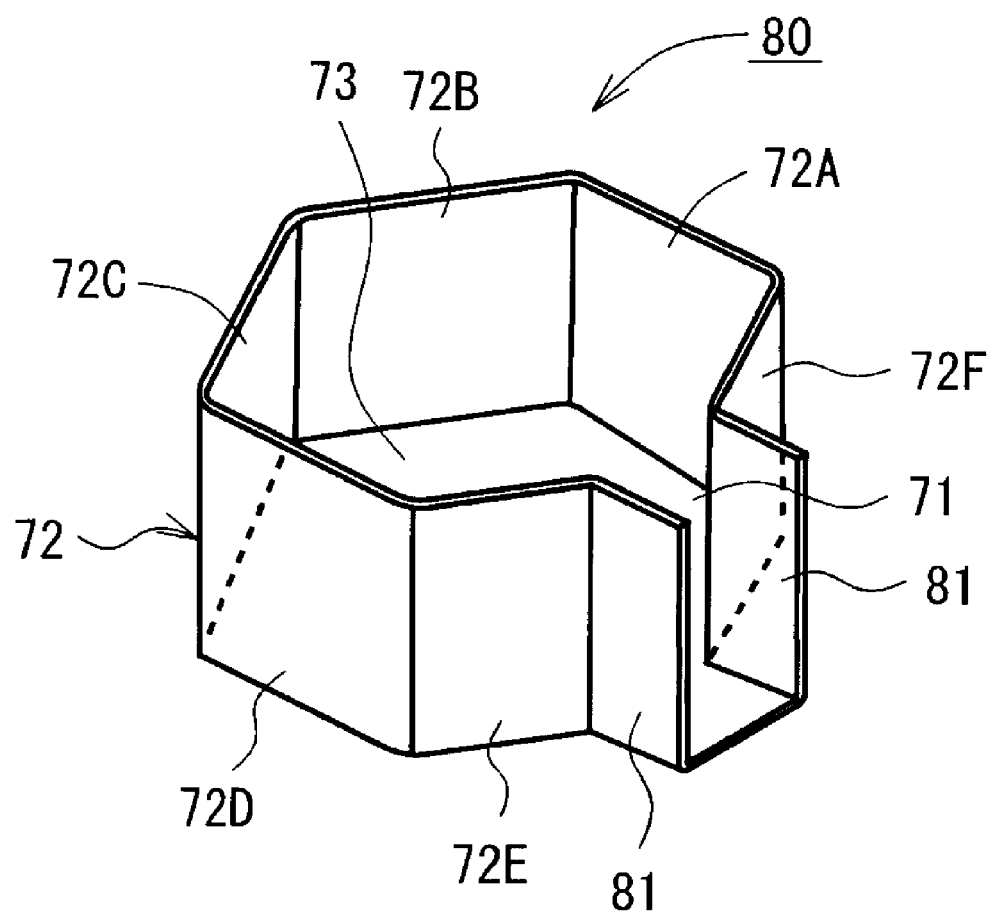
FIG. 15 is a perspective view of a cap of a relief valve according to a sixth preferred embodiment.
Figure 16:
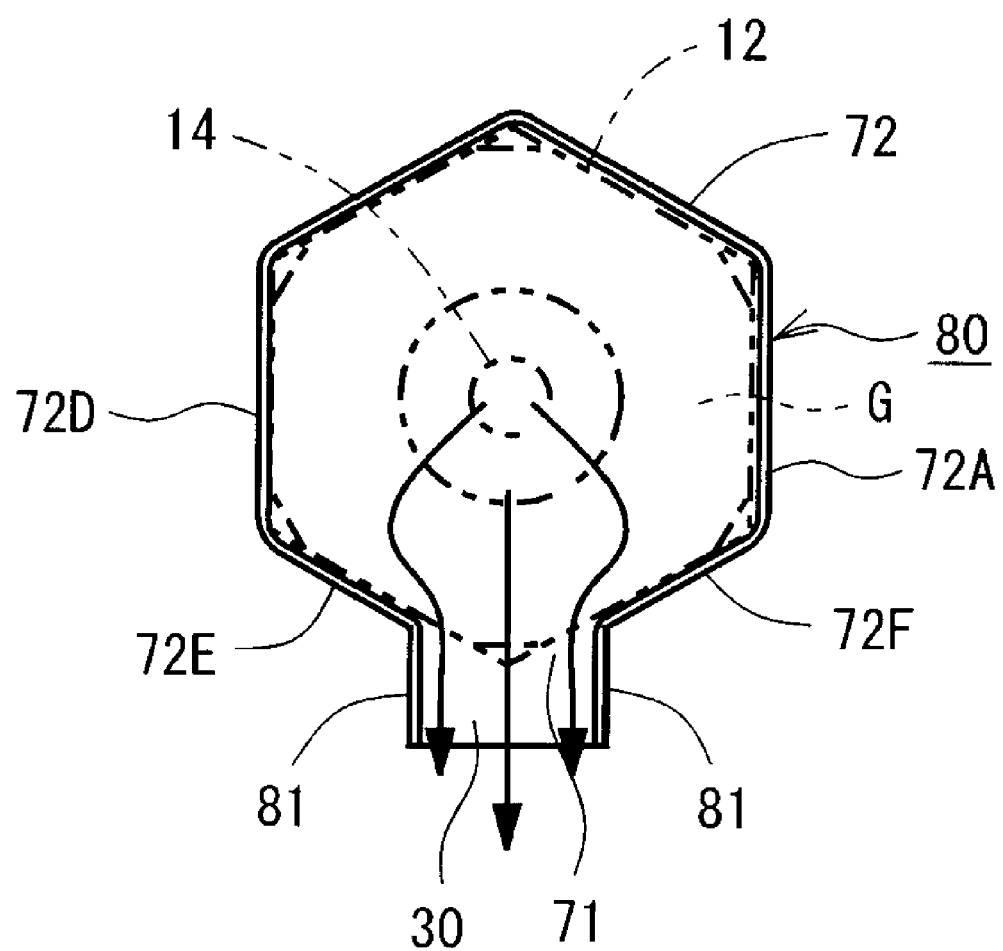
FIG. 16 is a schematic view of the relief valve of FIG. 15, illustrating the operating of the relief valve when refrigerant gas is being blown through the relief valve.

The following will describe a relief valve according to a sixth preferred embodiment of the present invention with reference to FIGS. 15 and 16. The sixth preferred embodiment differs from the fifth preferred embodiment in that the shape of the cap 70 of the fifth preferred embodiment is modified, and the rest of the structure is substantially the same as that of the fifth preferred embodiment. For the convenience of explanation, common or similar elements or parts of the sixth preferred embodiment are designated by the same reference numerals as those used in the first preferred embodiment. Therefore, the description of such elements or parts will be omitted and only the modifications will be described.

Referring to FIG. 15, numeral 80 designates a cap 80 that includes a cap wall 72 having formed therein a cutout 71 and a cap end 73 in connection with the cap wall 72. The cap 80 is of substantially the same structure as the cap 70 of the fifth preferred embodiment. In the cap 80, the cutout 71 is formed between two guide walls 81 extending radially outward from the side edges of the cap wall portions 72E and 72F.

The cap 80 is mounted on the valve body 12 by moving the cap 80 relative to the valve body 12 in the axial direction of the valve body 12 such that the cap end 73 covers the relief port 14 and the cap wall 72 is engaged with the outer peripheral surface 23 of the valve body 12. The cover 17 is mounted on the valve body 12 by moving the cover 17 relative to the valve body 12 in the radial direction of the valve body 12 so that the cover 17 covers the cap 80 on the valve body 12 from the top of the cap 80 and the positions of the cutout 71 of the cap 80 and the cutout 18 of the cover 17 coincide with each other.

Referring to FIG. 16, refrigerant gas blown out through the relief port 14 flows toward the outlet 30 through the clearance G. The guide walls 81 are connected directly to the cap wall portions 72E and 72F between which the cutout 71 is formed. The refrigerant gas guided by the guide walls 81 flows out through the outlet 30, as indicated by arrows in FIG. 16. Thus, the flowing direction of the refrigerant gas blown out through the relief port 14 may be regulated toward the outlet 30. The sixth preferred embodiment offers substantially the same advantageous effects as those of the fifth preferred embodiment.

The present invention is not limited to the above-described first through sixth embodiments, but is may be variously modified within the scope of the invention. The following will describe several modifications over the first though sixth embodiments.

According to the first and second preferred embodiments of the present invention, firstly the cover 17 (41) and cap 25 are made separately and then temporarily connected to each other thereby to form the cap unit 16 (40). Subsequently, the cap unit 16 (40) is mounted on the valve body 12. Alternatively, the cover 17 (41) and cap 25 which are made separately and may be connected integrally to each other by spot welding. In this case, the resulting cap unit 16 (40) may be handled as one integral part, so that assembling process of the relief valve 10 may be facilitated. Additionally, the cap unit 16 (40) may be prevented from being separated into the cover and the cap before the cap unit 16 (40) is mounted on the valve body 12.

According to the first and second preferred embodiments of the present invention, firstly the cover 17 (41) and cap 25 are made separately and temporarily connected to each other thereby to form the cap unit 16 (40). Subsequently, the cap unit 16 (40) is mounted on the valve body 12. Alternatively, firstly the cap 25 may be mounted on the valve body 12 and then the cover 17 (41) may be mounted on the valve body 12 so as to cover the cap 25.

According to the first and second preferred embodiments of the present invention, single fixing hook 24 (46) which is engageable with the cut 15 of the valve body 12 is formed in the cover wall 19 (43) on the opposite side of a pair of the holding arms 21 (45). Alternatively, more than one fixing hook 24 (46) may be formed in the cover wall 19 (43).

According to the first and second preferred embodiments of the present invention, the cap 25 is formed by drawing operation. Alternatively, the cap 25 may be formed by any other operations, such as machining or casting. Alternatively, the cap 25 may be formed by bending a plate as in the case of the cover 17. In such cases, a small gap is formed between the cap wall 27 and the cap end 28, thereby allowing leakage of refrigerant gas through such gap. However, most of the refrigerant gas blown out from the relief valve 10 flows through a flowing passage for refrigerant gas formed from the relief port 14 to the outlet 30 through the clearance G. Therefore, a flowing passage for refrigerant gas is formed for preventing refrigerant gas released from the relief port 14 from impinging against the peripheral devices.

The cap 25 may be made of a resin. The cap 25 made of a resin is easy to manufacture and free from a gap between the cover end 20 and the cover wall 19.

According to the first and second preferred embodiments of the present invention, the clearance G is formed between the cap 25 and the valve body 12. Alternatively, it may be so arranged that the cap end 28 is normally in direct contact with the relief port 14 without forming the clearance G therebetween, but the cap end 28 is moved away from the relief port 14 by the pressure of refrigerant gas blown out from the relief port 14, thereby forming the clearance G between the cap end 28 and the relief port 14.

According to the third preferred embodiment of the present invention, the bent portion 54 has a flat shape. Alternatively, the bent portion 54 may have a shape conforming to the outer peripheral surface 23 of the valve body 12. In such a case, a second clearance such as R is formed between the surface of the bent portion 54 and the outer peripheral surface 23 of the valve body 12.

Figure 17:
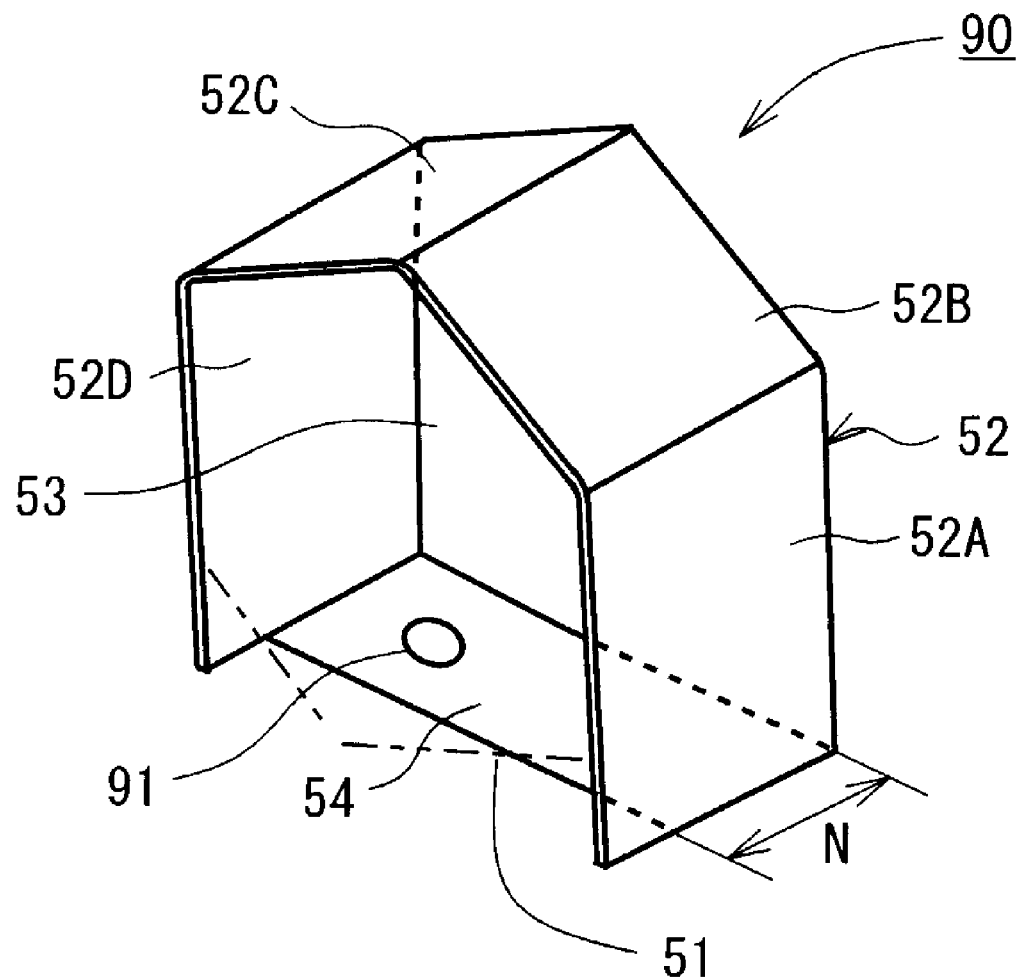
FIG. 17 is a perspective view of a cap of a relief valve according to another preferred embodiment.

According to the third preferred embodiment of the present invention, the bent portion 54 serves as a flow turning plate formed in the edge of the opening of the cap 50. Alternatively, the opening may be formed in the bent portion 54 of the cap 50. As shown in FIG. 17, a hole 91 serving as the opening is formed in the cap 90 through the bent portion 54 in the present alternative embodiment. In this case, the hole 91 communicates with the clearance R, and an additional passage for refrigerant gas is formed extending through the clearance R and the hole 91 and allowing refrigerant gas to flow out of the compressor. The hole 91 may be formed in the bent portion 54 at any position, through which refrigerant gas may be pass.

According to the fourth preferred embodiment of the present invention, the axial length of the curved edge 64 extending from the cap end 63 is greater than the axial length of the clearance R. Alternatively, the curved edge 64 may be formed to have an axial length that is smaller than the axial length of the clearance G. In this case, as in the first preferred embodiment, the cap 60 may be mounted on the valve body 12 by moving the cap 60 relative to the valve body 12 in the radial direction of the valve body 12, or the cap 60 may be connected to the cover 17 and then mounted on the valve body 12 by moving the cap 60 relative to the valve body 12 along the radial direction of the valve body 12.

What is claimed is:

1. A relief valve for a compressor comprising:
   a valve body including an end and a peripheral surface;
   a relief port formed in the end of the valve body, the relief port through which refrigerant gas is blown out if pressure in the compressor is excessively increased;
   a cap including an end of said cap, and a peripheral surface of said cap engageable with the peripheral surface of the valve body; and
   a cover including an end, a peripheral surface engageable with the peripheral surface of the cap and an engaging portion engageable with the valve body such that the cover is prevented from moving relative to the valve body,
   wherein, when the cover is mounted on the valve body through the cap, the relief port is covered by the end of the cap, such that a first clearance is formed between the end of the cap and the end of the valve body so as to be in communication with the relief port, and a flowing passage for refrigerant gas blown out from the relief valve is formed from the relief port through the first clearance, and
   wherein the cap is mounted between the cover and the valve body so as to be movable in an axial direction of the valve body due to pressure of refrigerant gas blown out of the relief port, and wherein the cap is movable with respect to the cover while the cover is mounted to the valve body.

2. The relief valve according to claim 1, wherein an opening is formed through the peripheral surface of the cover.

3. The relief valve according to claim 2, wherein the axial length of the cover as measured between the end of the cover and the engaging portion of the cover is greater than the axial length of the peripheral surface of the cap.

4. The relief valve according to claim 2, wherein the peripheral surface of the cap has a regular hexagonal prism shape, and the peripheral surface of the cover has a regular hexagonal prism shape, the opening of the cover is formed by removing two adjacent lateral faces of the regular hexagonal prism shape of the peripheral surface of the cover so that the peripheral surface of the cover has four lateral faces, the engaging portion is a pair of holding arms formed by extending from respective two of the four lateral faces each continuous with respective opposite sides of the opening of the cover, and the distance between distal ends of the holding arms is shorter than the distance between the opposite sides of the opening of the cover.

5. The relief valve according to claim 4, wherein the two of the four lateral faces of the cover are inclined such that the distance between the two lateral faces is decreased to the opening of the cover.

6. The relief valve according to claim 4, wherein an opening is formed through the peripheral surface of the cap.

7. The relief valve according to claim 6, wherein the opening of the cap is formed by removing two adjacent lateral faces of the regular hexagonal prism shape of the peripheral surface of the cap.

8. The relief valve according to claim 6, wherein a flow turning plate is formed at the edge of the opening of the cap and the direction of the flowing passage for refrigerant gas is changed by the flow turning plate.

9. The relief valve according to claim 8, wherein the flow turning plate is formed by bending a part of the end of the cap on a side of the opening of the cap.

10. The relief valve according to claim 4, wherein the cover is made of a metal plate, and a part of the end of the cover is continuous with the peripheral surface of the cover only at one side of the regular hexagonal prism shape of the peripheral surface of the cover.

11. The relief valve according to claim 2, wherein a fixing hook is formed in the peripheral surface of the cover at the end of the lateral edge of the peripheral surface of the cover which are positioned opposite to the opening of the cover to be engageable with the valve body.

12. The relief valve according to claim 1, wherein, when the cover is mounted on the valve body through the cap, a second clearance is formed between the peripheral surface of the cap and the peripheral surface of the valve body so as to be in communication with the first clearance.

* * * * *